United States Patent
Fukuda et al.

(10) Patent No.: US 7,899,144 B2
(45) Date of Patent: Mar. 1, 2011

(54) SEMICONDUCTOR INTEGRATED CIRCUIT DEVICE

(75) Inventors: Koji Fukuda, Fuchu (JP); Hiroki Yamashita, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 670 days.

(21) Appl. No.: 11/937,592

(22) Filed: Nov. 9, 2007

(65) Prior Publication Data

US 2008/0112522 A1 May 15, 2008

(30) Foreign Application Priority Data

Nov. 10, 2006 (JP) .................. 2006-305379

(51) Int. Cl.
*H04L 7/00* (2006.01)
(52) U.S. Cl. .................. 375/371; 375/354; 370/503
(58) Field of Classification Search .................. 375/371, 375/354; 370/503
See application file for complete search history.

(56) References Cited

U.S. PATENT DOCUMENTS

| 6,545,507 | B1 * | 4/2003 | Goller .................. 326/93 |
| 7,433,397 | B2 * | 10/2008 | Garlepp et al. .................. 375/229 |
| 2004/0114632 | A1 | 6/2004 | Yuuki et al. |
| 2006/0193414 | A1 * | 8/2006 | Gregorius et al. .................. 375/355 |

FOREIGN PATENT DOCUMENTS

JP 2004-180188 6/2004

OTHER PUBLICATIONS

K. Yamaguchi, et al., "12Gb/s Duobinary Signaling with x2 Oversampled Edge Equalization", 2005 IEEE International Solid-State Circuits Conference Digest of Technical Papers, Feb. 7, 2005, pp. 70-71.

* cited by examiner

*Primary Examiner* — Shuwang Liu
*Assistant Examiner* — Michael R Neff
(74) *Attorney, Agent, or Firm* — Antonelli, Terry, Stout & Kraus, LLP.

(57) ABSTRACT

The present invention is to provide a semiconductor integrated circuit device provided with a sufficient margin to variations of input waveforms. For example, the semiconductor integrated circuit device is provided with a clock and data determination circuit receiving an input data signal and a clock signal and outputting a recovered data signal, a first phase comparison signal and a second phase comparison signal and a clock signal generating circuit generating the clock signal with a phase corrected based on the first phase comparison signal and the second phase comparison signal. The clock and data determination circuit latches the input data signal in synchronization with the clock signal using a plurality of thresholds as determination reference and generates two kinds of candidates composed of combination of a recovered data signal and phase comparison signals by processing a latch result. Further, one of the two kinds of candidates is selected by a selector circuit based on a symbol of a recovered data signal at a previous cycle.

15 Claims, 18 Drawing Sheets

● LATCH FOR SYMBOL DETERMINATION
✗ LATCH FOR PHASE COMPARISON (GUARD LATCH)
◯ PHASE COMPARATOR

- ● FRONT SIDE LATCH (Front)
- ✕ REAR SIDE LATCH (Rear)
- ⌒ SYMBOL DETERMINATIOR / PHASE COMAPRATOR ▲ PREFERABLE SYMBOL DETERMINATION POSITION
● LATCH FOR SYMBOL DETERMINATION
✕ LATCH FOR EDGE DETECTION

● LATCH FOR SYMBOL DETERMINATION
✕ LATCH FOR EDGE DETECTION

● LATCH FOR SYMBOL DETERMINATION
▪▪▪▪▪▪▪▪ EYE OF SYMBOL DETERMINATOR IN UPSIDE
━ ▪ ━ EYE OF SYMBOL DETERMINATOR IN DOWNSIDE

SEMICONDUCTOR INTEGRATED CIRCUIT DEVICE

CROSS-REFERENCE TO RELATED APPLICATION

The present application claims priority from Japanese Patent Application No. JP 2006-305379 filed on Nov. 10, 2006, the content of which is hereby incorporated by reference into this application.

TECHNICAL FIELD OF THE INVENTION

The present invention relates to a semiconductor integrated circuit device, and in particular to a technique effectively applied to a semiconductor integrated circuit device including a CDR (Clock and Data recovery) circuit.

BACKGROUND OF THE INVENTION

For example, Japanese Patent Application Laid-Open Publication No. 2004-180188 (Patent Document 1) discloses a clock and data recovery circuit enabling improvement of jitter tolerance and the like. In the clock and data recovery circuit, an edge of data and an edge of a clock are compared with each other, and in a case where a distance therebetween is shorter than a reference value, recovery of a clock is performed by conducting control such that the edge of the clock is kept away from the edge of data.

And, "12 Gb/s Duobinary Signaling with x2 Oversampled Edge Equalization", 2005 IEEE International Solid-State Circuits Conference Digest of Technical Papers, Feb. 7, 2005, pp. 70-71 (Non-Patent Document 1) discloses a configuration of a transmission system utilizing a Duobinary transmission method. In the transmission system, binary data (1, 0) from a transmitter side is transmitted to a receiving circuit using the Duobinary transmission method and recovery of a clock signal and a data signal is performed in the receiving circuit. Recovery of the clock signal is performed by detecting a point of crossing in an intermediate level of amplitude of an input signal by the clock recovery circuit. Recovery of the data signal is performed by comparison and determination between the amplitude of the input signal and two reference voltages (intermediate amplitude levels ±Vref) at a timing of a recovered clock signal. And thereby, ternary data (2, 1, 0) can be obtained by the comparison and determination and original binary data (1, 0) is recovered by decoding the ternary data.

SUMMARY OF THE INVENTION

In recent years, according to rapid speed-up of a transmission rate of communication between LSIs or between substrates, a serial transmission method in which both of data and clocks are superimposed and transmitted through one signal line has spread widely instead of a conventional parallel transmission method using a translational clock. In the serial transmission method, it is necessary to increase a transmission rate per one signal line significantly. However, with increase of a transmission rate, attenuation of high-frequency components in the transmission signal is increased by a skin effect of a transmission path conductor, dielectric loss of insulating material or the like, and therefore, in a receiver side, dependency on a symbol sequence called ISI (Inter Symbol Interference) appears in an input waveform and signal quality is deteriorated. And thereby, an eye pattern in the receiver side is narrowed on both a time axis direction (width) and an amplitude direction (height) and a signal reception error is caused.

As a method of realizing high-speed transmission while allowing occurrence of such ISI, there is a duobinary transmission method shown in Non-Patent Document 1. FIG. 18 is a circuit diagram showing one example of a configuration of a semiconductor integrated circuit device examined as a premise of the present invention. The semiconductor integrated circuit device reflects a feature of the receiving circuit shown in Non-Patent Document 1. The semiconductor integrated circuit device shown in FIG. 18 includes a clock and data recovery circuit CDR, and the CDR is composed of a data recovery circuit DR, a clock recovery circuit CR and a clock signal generating circuit CLK_GEN.

The clock recovery circuit CR latches an input data signal DIN using rising and falling of a clock signal CLK from the CLK_GEN respectively and controls the CLK_GEN by comparing latch results. The CLK_GEN outputs the CLK with an appropriate phase based on a latch result at the CR. The data recovery circuit DR sets different thresholds to the DIN by threshold setting circuits VTSET_H and VTSET_L and respective outputs of the VTSET_H and the VTSET_L are latched at rising of the CLK. And, a data signal DATA is recovered by outputting one of two latch results through a selector circuit SEL. At this time, a value of a data signal DATA at a previous cycle is used for selection in the SEL.

FIGS. 19A and 19B are diagrams for explaining one example of operation using the semiconductor integrated circuit device shown in FIG. 18. FIG. 19A is a waveform diagram representing operation of the data recovery circuit to an input data signal and FIG. 19B is a waveform diagram representing operation of the clock recovery circuit. For example, in a case where the duobinary transmission method described above is used, an input data signal DIN shown in FIG. 18 forms a waveform (an eye pattern) shown in FIG. 19A. Note that, a duobinary eye pattern according to the duobinary transmission method may mean a pattern in which an eye opened small with a center of a threshold VT_C in FIG. 19A is closed. And therefore, in order to distinguish from such a pattern, a pattern in which the small eye is opened may be called "EE (Edge Equalize)-NRZ eye pattern". Since embodiments explained later can be applied similarly to both the eye patterns, these eye patterns are not distinguished from each other and an eye pattern shown in FIG. 19A is referred to as "a bipolar NRZ eye pattern" in this specification.

In the bipolar NRZ eye pattern, since bits (symbols) adjacent to each other in a time axis direction interfere with each other (namely, ISI occurs), an orbit of a waveform changes according to a bit pattern (symbol sequence). For example, at data cycles corresponding to three bits t[−1], t[0] and t[1], when 'L' level continues over three bits, an orbit from t[0] toward t[1] forms a straight orbit in a lower side shown by (LLL). At this time, as the orbit from t[−1] toward t[0], there are two kinds of routes, that is, a route passing through a straight line in the lower side and a route falling rightward. Determination about which route the orbit passes through is made depending on a value of a bit at a timing t[−2].

And, when change to 'H' level occurs after 'L' level continues over two bits, the orbit from t[0] toward t[1] takes a route rising rightward shown by (LLH). At this time, like the case of (LLL), a route of the orbit from t[−1] toward t[0] is determined depending on a value of a bit at t[−2]. Thus, with respect to other bit patterns, orbits pass through routes as shown by (LHL), (LHH), . . . , (HHH) in FIG. 19A.

In such an eye pattern, it is preferable that a value of each bit is determined using the two thresholds VT_H and VT_L.

That is, when attention is focused on t[ ], in a case where a bit value at t[−1] is in 'H' level, an eye is opened in a relatively wide region surrounded by a thick dotted line in FIG. 19A, and even in a case where the bit value is in 'L' level, an eye is opened in a relatively wide region surrounded by a thick dashed-dotted line. Accordingly, when the bit value at t[−1] is in 'H' level, symbol determination about 'H'/'L' is made using the VT_H larger than a threshold VT_C of an intermediate level as a reference at t[0], and when the bit value is in 'L' level, the symbol determination is made using the VT_L smaller than the VT_C as a reference at t[0], as a result, a determination margin can be secured sufficiently.

And therefore, in the configuration shown in FIG. 18, the threshold VT_H is set at the threshold setting circuit VTSET_H, and the threshold VT_L is set at the threshold setting circuit VTSET_L. Specifically, symbol determinations using different threshold voltages are realized by adding offset voltages different from each other to the DIN at the VTSET_H and the VTSET_L and latching the obtained signal at latch circuits FF181 and FF182 provided with the same threshold voltage, respectively. Output from the FF181 and output from the FF182 are inputted to the selector circuit SEL. Selecting operation in the SEL is performed using a value obtained by delaying output from the SEL (that is, a recovered data signal DATA) at a one-cycle delay circuit DLY181. And thereby, one of the output from the FF181 (a latch result at the VT_H) and the output from the FF182 (a latch result at the VT_L) can be selected according to a previous symbol.

On the other hand, latch timings at the latch circuits FF181 and FF182 are determined by the clock signal CLK controlled by the clock recovery circuit CR. In the CR, operation shown in FIG. 19B is performed. In FIG. 19B, as shown in Non-Patent Document 1, an edge of the DIN is detected at the threshold VT_C in an intermediate level of the eye pattern shown in FIG. 19A and a phase of the CLK is adjusted. That is, as understood from FIG. 19A, latch timings at the FF181 and the FF182 should be set to a timing on a point at which a plurality of waveform orbits cross on the VT_C. And therefore, in order to adjust a rising timing TGe of the CLK to the point of crossing, the rising timing TGe of the CLK and falling timings TGd and TGf adjacent on both sides of the rising timing TGe are used, as shown in FIG. 19B.

In the example shown in FIG. 19B, if a symbol of the DIN is determined utilizing the VT_C as a reference voltage, it is determined as 'L' at the rising timing TGe of the CLK, and it is determined as 'L' also at the falling timing TGd adjacent on a left side, and it is determined as "H" at the falling timing TGf adjacent on a right side. And therefore, it is understood that the point of crossing (the edge of DIN) exists between the TGe and the TGf adjacent to the TGe on a right side which are determined to be different symbols and it is understood that a phase of the CLK should be shifted rightward so as to be adjusted to the edge. Note that, a method to adjusting to an edge described above is called "an edge adjusting method" in this specification.

In the specification, as shown in FIG. 21, in a case where an edge of the data signal is positioned between a clock timing TG2 to be an object of adjustment and a clock timing TG1 for phase comparison adjacent thereto on a left side, a phase comparison signal EARLY is generated. On the other hand, in a case where the edge of the data signal is positioned between the TG2 and a clock timing TG3 for phase comparison adjacent thereto on a right side, a phase comparison signal LATE is generated. In the example shown in FIG. 19B, since an edge of the DIN exists between the TGe and the TGf, the LATE is generated and the CLK is corrected to a right side on reception of the LATE.

In order to realize such operation, in the configuration shown in FIG. 18, the DIN in which setting of a threshold is not performed is latched at rising of the CLK by a latch circuit FF184 and latched at falling of the CLK by a latch circuit FF183. And, by comparing output of the FF184 and output of the FF183 in an EXOR circuit EOR181, the latch results of the DIN at the rising timing TGe and the falling timing TGf adjacent thereto on a right side in FIG. 19B are compared with each other. And, by comparing the output of the FF184 and a signal obtained by delaying the output from the FF183 at a one-cycle delay circuit DLY182 in an EXOR circuit EOR 182, latch results of the DIN at the rising timing TGe and the falling timing TGd adjacent thereto on a left side are compared with each other. The clock signal generating circuit CLK_GEN reflects these comparison results and generates the CLK with a corrected phase.

In such a configuration, however, there is a possibility that a tolerance (margin) to waveform variations of the DIN cannot be assured sufficiently. FIG. 20 is a waveform diagram showing an actual state of an eye pattern shown in FIG. 19A. As understood from FIG. 20, respective waveform orbits in FIG. 19A actually have variations, in particular, at a point of crossing on the VT_C on which almost all waveform orbits cross one another, variations are overlapped, and relatively large variations occur. Accordingly, if a rising edge of the CLK is caused to adjust to the point of crossing using the clock recovery circuit CR shown in FIG. 18, phases of the CLKs outputted from the CLK_GEN are fluctuated largely, and therefore, there is a possibility that correct DATA cannot be recovered at the DR or a proper CLK cannot be recovered at the CR due to such fluctuation.

Accordingly, an object of the present invention is to provide a semiconductor integrated circuit device provided with a sufficient margin to variations of input waveforms. The above and other objects and novel characteristics of the present invention will be apparent from the description of this specification and the accompanying drawings.

The typical ones of the inventions disclosed in this application will be briefly described as follows.

The semiconductor integrated circuit device according to the present invention includes a clock and data recovery circuit. The clock and data recovery circuit is provided with a second circuit which latches an input data signal by a clock signal using a plurality of thresholds different from each other as logic determination references and outputs two kinds of candidates composed of combination of a recovered data signal and phase comparison signals by processing results of latching and a third circuit which selects one of the two kinds of candidates and outputs the selected one. And, the third circuit determines which one to be selected from the two kinds of candidates at a focused data cycle based on a symbol of recovered data signal at a previous data cycle.

As described above, by selecting and determining not only the recovered data signal but also the phase comparison signal at the focused data cycle based on a symbol of the recovered data signal at the previous data cycle, a margin to variations of input waveforms can be improved as compared with a case in which no alternative of a phase comparison signal exists like the conventional art (for example, a case in which determination is made according to a latch result using one threshold only).

As an effect obtained by a representative one of the inventions disclosed in the present application, a semiconductor integrated circuit device including a clock and data recovery circuit provided with a sufficient margin to variations of input waveforms can be realized.

BRIEF DESCRIPTIONS OF THE DRAWINGS

DESCRIPTIONS OF THE PREFERRED EMBODIMENTS

In the following embodiments, a description will be given by dividing into a plurality of sections or embodiments as occasion demands as a matter of convenience, however, the elements are not nothing to each other except a particularly clear description, but one is a modified example, details, a supplementary explanation or the like of a part or a whole of the other. Further, in the following embodiments, in the case of referring to a number of elements (including a number, a numerical value, an amount, a range and the like), the present invention is not limited to the defined number except the case of the particular definition and the case of apparently limited to the specific number in principle, but may be equal to or more than the defined number or equal to or less than the defined number.

And, in the following embodiments, constituent elements (including elementary steps and the like) thereof are not essential for the present invention except for the case of the particular definition, the case that the constituent elements are thought to be essential clearly in principle, and the like. Similarly, in the following embodiments, when shapes of constituent elements, positional relationships among the elements and the like are referred to, they include ones substantially close to or similar to the shapes and the like except for the case of the particular definition, the case that it is thought that shapes, positional relationships, and the like are apparently different in principle and the like. This can be applied to the abovementioned numerical value and range similarly.

Hereinafter, embodiments of the present invention will be described in detail with reference to the accompanying drawings. Note that the same components are denoted by the same reference symbols throughout the drawings for describing the embodiment, and the repetitive description thereof will be omitted.

First Embodiment

Figure 1:
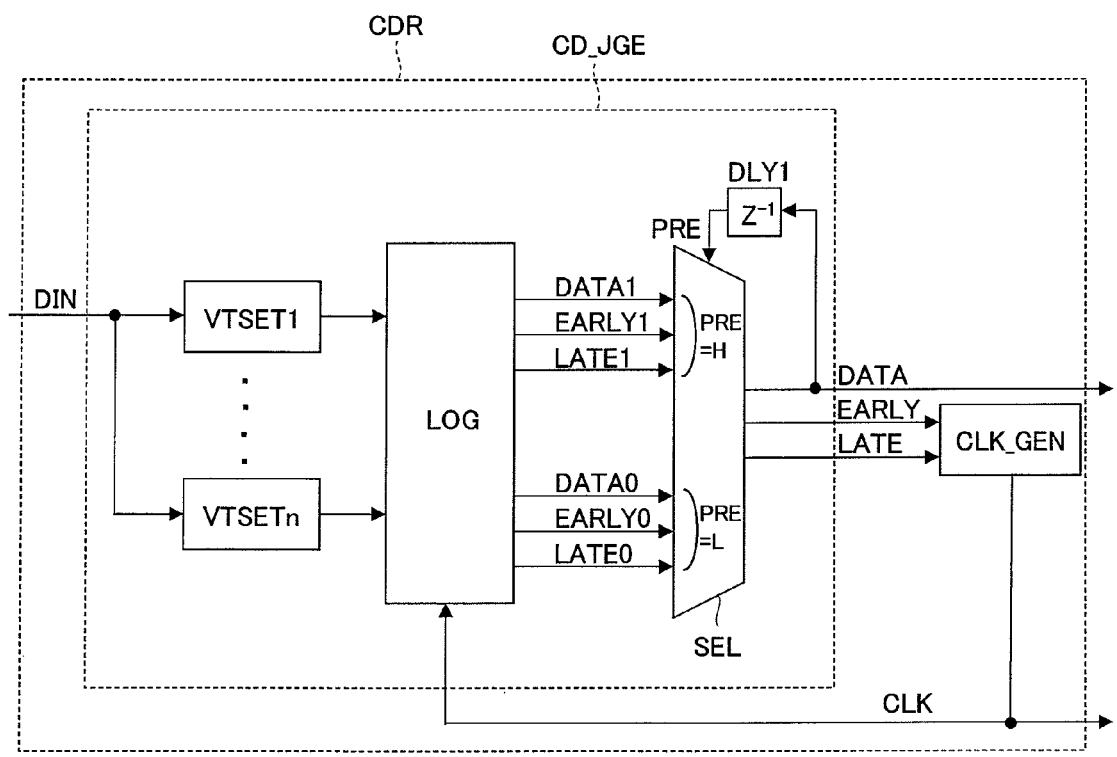
FIG. 1 is a block diagram showing one example of a configuration of a semiconductor integrated circuit device according to a first embodiment of the present invention.

FIG. 1 is a block diagram showing one example of a configuration in a semiconductor integrated circuit device according to a first embodiment of the present invention. The semiconductor integrated circuit device according to the first embodiment includes a clock and data recovery circuit CDR. The CDR is composed of a clock and data determination circuit CD_JGE and a clock signal generating circuit CLK_GEN. The CD_JGE includes a plurality of threshold setting circuits VTSET1 to VTSETn (n≧2), a logic circuit LOG, a selector circuit SEL and a one-cycle delay circuit DLY1. The CD_JGE makes symbol determination to an input data signal DIN at a timing of a clock signal CLK, outputs a recovered data signal DATA. In addition, the CD_JGE makes comparison determination about whether a phase of the CLK is appropriate with respect to a phase of the DIN and outputs a phase comparison signal EARLY and LATE which are results of the comparison determination, to the CLK_GEN. The CLK_GEN outputs the CLK with a phase corrected based on the EARLY and the LATE. The CLK is inputted into the LOG and is used as a recovered clock signal.

The VTSET1 to VTSETn set different threshold voltages to the DIN, respectively. The LOG latches signals set with these threshold voltages by the CLK and performs processing such as various determinations to a latch result and outputs two kinds of signal groups {(DATA1, EARLY1, LATE1) and (DATA0, EARLY0, LATE0)} composed of combination of the data signal and the phase comparison signals as candidates. The SEL selects one of the two candidates and outputs the selected one. The selected data signal becomes the recovered data signal DATA and the selected phase comparison signals EARLY and LATE become output signals toward the CLK_GEN. Note that, selection in the SEL is performed using a value obtained by delaying the recovered data signal DATA by one cycle at the DLY1. That is, a configuration in which the recovered data signal DATA and the phase comparison signals EARLY and LATE at a focused data cycle are determined based on a value of the recovered data signal DATA at a previous data cycle is employed.

Figure 18:
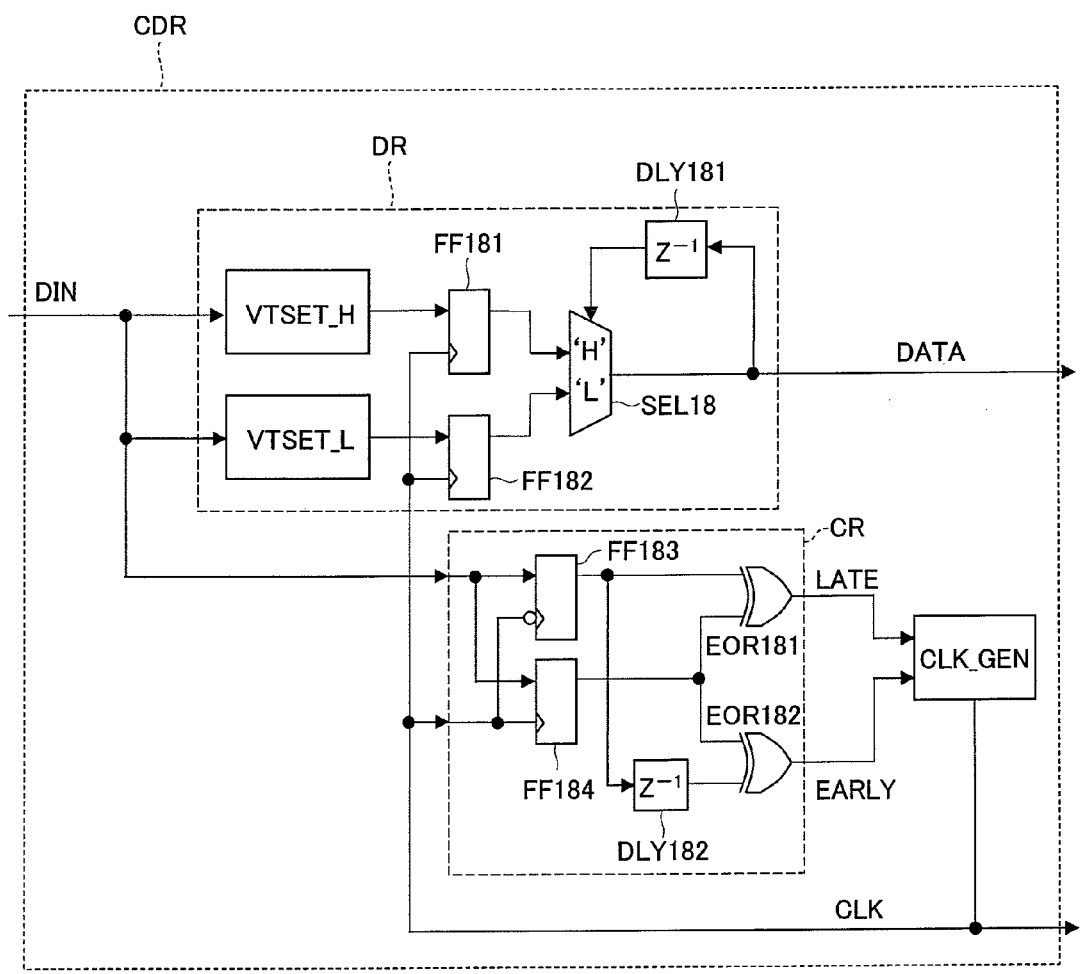
FIG. 18 is a circuit diagram showing one example of a configuration of a semiconductor integrated circuit device examined as a premise of the present invention.

A main feature of this configuration is that not only the recovered data signal DATA at the focused data cycle but also the phase comparison signals EARLY and LATE are determined based on a value of the recovered data signal DATA at the previous data cycle, unlike the abovementioned configuration shown in FIG. 18. And thereby, though described in detail later, a margin to waveform variations of the input data signals DIN can be improved.

Figure 2:
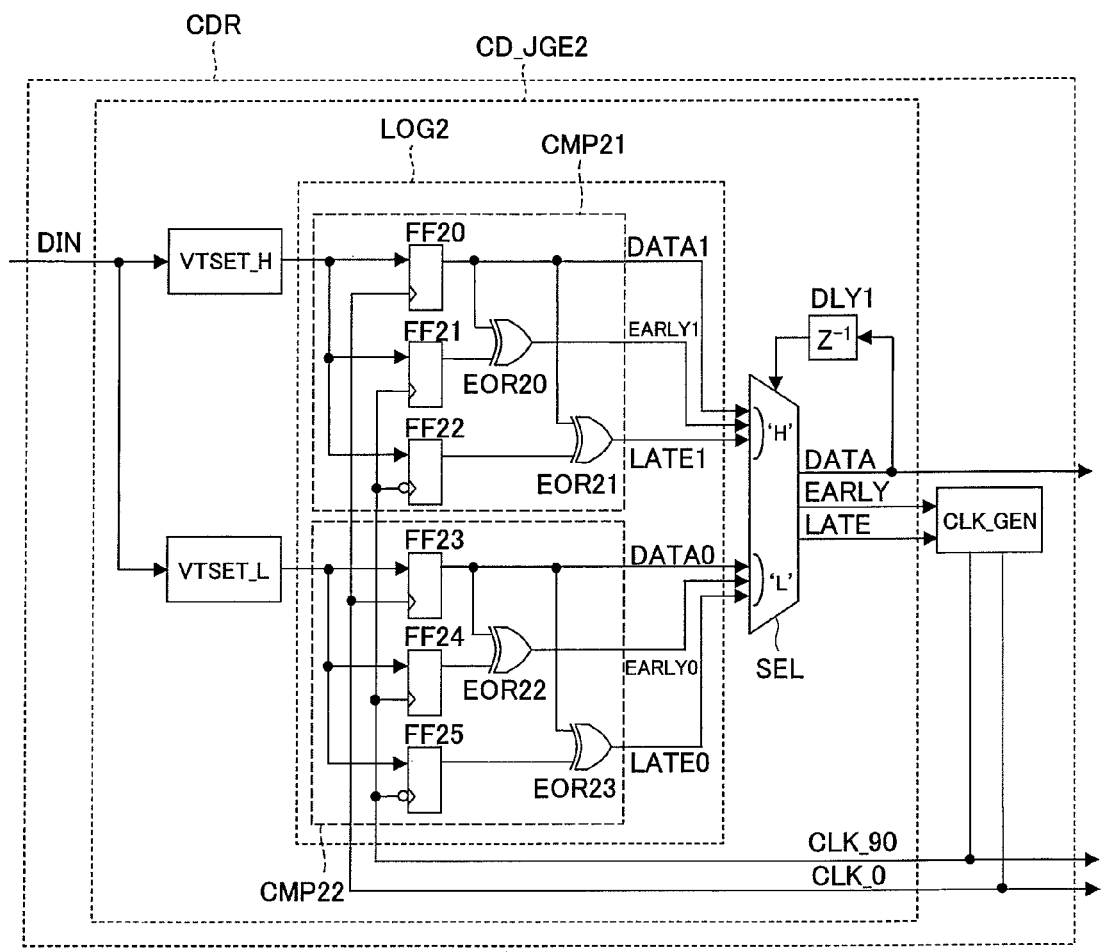
FIG. 2 is a circuit diagram showing a detailed configuration example of the semiconductor integrated circuit device shown in FIG. 1.

FIG. 2 is a circuit diagram showing a detailed configuration example of the semiconductor integrated circuit device shown in FIG. 1. In the semiconductor integrated circuit device shown in FIG. 2, a clock and data determination circuit CD_JGE2 is composed of two threshold setting circuits VTSET_H and VTSET_L, a logic circuit LOG2, a selector circuit SEL and a one-cycle delay circuit DLY1. The LOG2 includes a comparison circuit CMP21 receiving output of the VTSET_H, performing various comparisons and determinations and outputting a signal group (DATA1, EARLY1, LATE1) and a comparison circuit CMP22 receiving output of the VTSET_L and outputting a signal group (DATA0, EARLY0, LATE0) similarly.

The VTSET_H and the VTSET_L are, for example, circuits adding different offset voltages to an input data signal DIN, respectively. Here, a value of the offset voltage added by the VTSET_H is smaller than a value of the offset voltage added by the VTSET_L. In a case where output of the VTSET_H and output of the VTSET_L are determined by the same voltage level, determining the output of the VTSET_H becomes equal to determination using a relatively high threshold voltage to the DIN, and determining the output from the VTSET_L becomes equal to determination using a relatively low threshold voltage to the DIN.

The comparison circuit CMP21 is composed of latch circuits FF20 to FF22 and EXOR circuits EOR20 and EOR21. The FF20 latches output of the VTSET_H at a rising timing of a clock signal CLK_0 from the CLK_GEN. The FF21 latches output of the VTSET_H at a rising timing of a clock signal CLK_90 from the CLK_GEN, and the FF22 latches output of the VTSET_H at a falling timing of the CLK_90. Note that, the CLK_90 is a signal obtained by shifting a phase of the CLK_0 by 90°. The EOR20 performs an EXOR operation of output of the FF20 and output of the FF21 and outputs a result of the operation as the phase comparison signal EARLY1. The EOR21 performs an EXOR operation of the output of the FF20 and output of the FF22 and outputs a result of the operation as the phase comparison signal LATE1. And, the output from the FF20 becomes a data signal DATA1.

The comparison circuit CMP22 has a configuration similar to the CMP21 except for an input source and an output destination, and composed of latch circuits FF23 to FF25 and EXOR circuits EOR22 and EOR23. The FF23 latches output of the VTSET_L at a rising timing of the CLK_0. The FF24 latches output of the VTSET_L at a rising timing of the CLK_90 and the FF25 latches output of the VTSET_L at a falling timing of the CLK_90. The EOR22 performs an EXOR operation of output of the FF23 and output of the FF24 and outputs a result of the operation as the phase comparison signal EARLY0. The EOR23 performs an EXOR operation of the output of the FF23 and the output of the FF25 and outputs a result of the operation as the phase comparison signal LATE0. And, the output from the FF23 becomes a data signal DATA0.

Figure 3A:
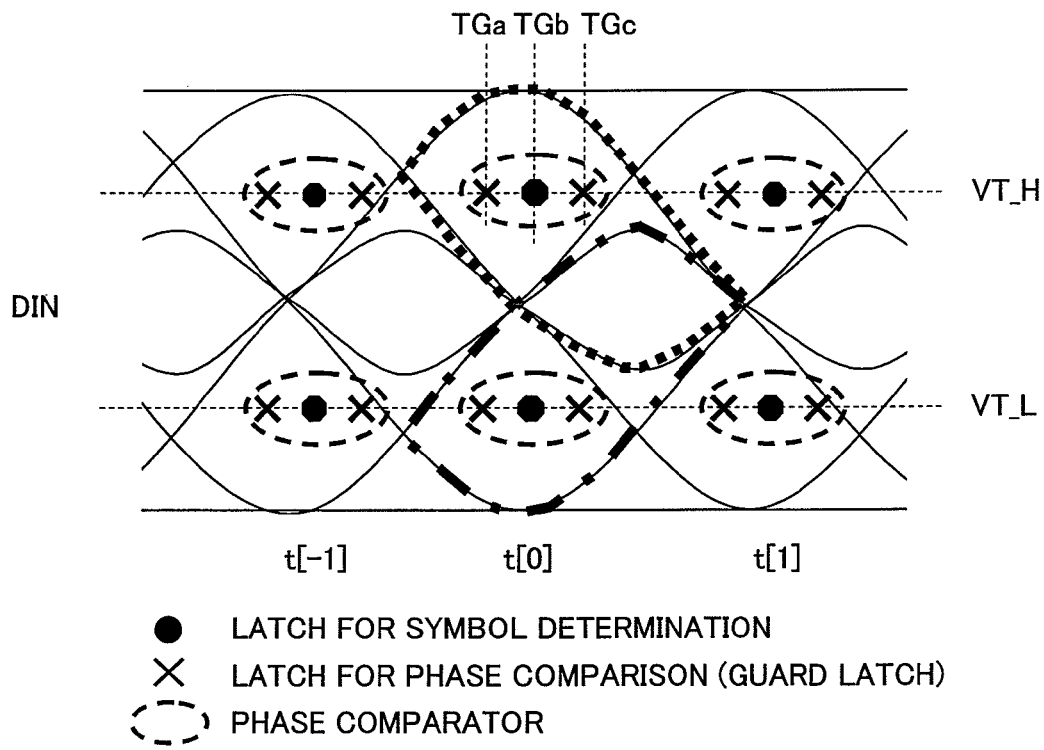
FIG. 3A is a waveform diagram showing operation of data recovery and clock recovery to an input data signal for explaining an example of operation of the semiconductor integrated circuit device shown in FIG. 2.
Figure 3B:
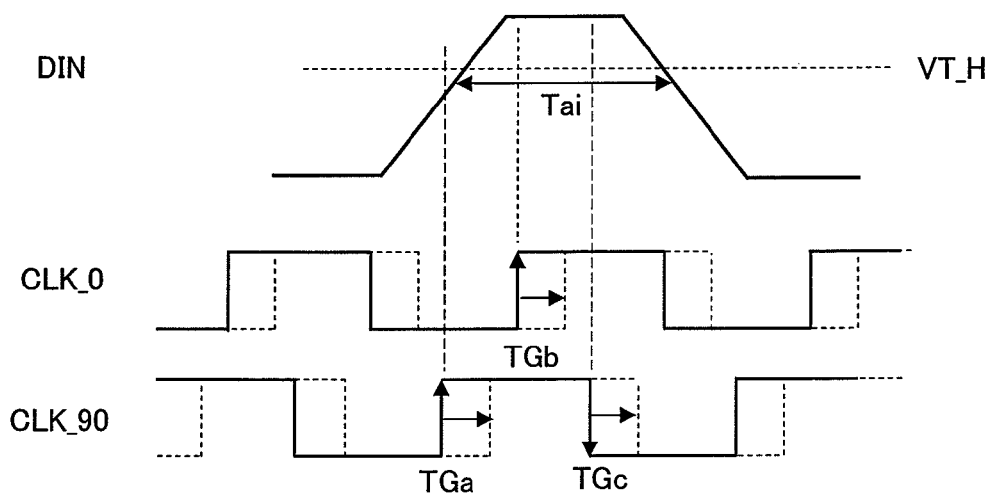
FIG. 3B is a waveform diagram showing more detailed operation of clock recovery for explaining an example of operation of the semiconductor integrated circuit device shown in FIG. 2.

FIGS. 3A and 3B are diagrams for explaining an operation example of the semiconductor integrated circuit device in FIG. 2. FIG. 3A is a waveform diagram representing operation of data recovery and clock recovery to an input data signal, and FIG. 3B is a waveform diagram representing a more detailed operation of the clock recovery. In the configuration shown in FIG. 2, as shown in FIG. 3A, symbol determination and phase comparison are performed using both a threshold VT_H higher than an intermediate level and a threshold VT_L lower than the intermediate level at data cycles t[−1], t[0], t[1] corresponding to three bits. And, determination which result to be used, a result of the determination and the comparison by the VT_H or a result of the determination and the comparison by the VT_L, is determined according to a value of recovered data (namely, a symbol determination result) at the previous data cycle.

Figure 19A:
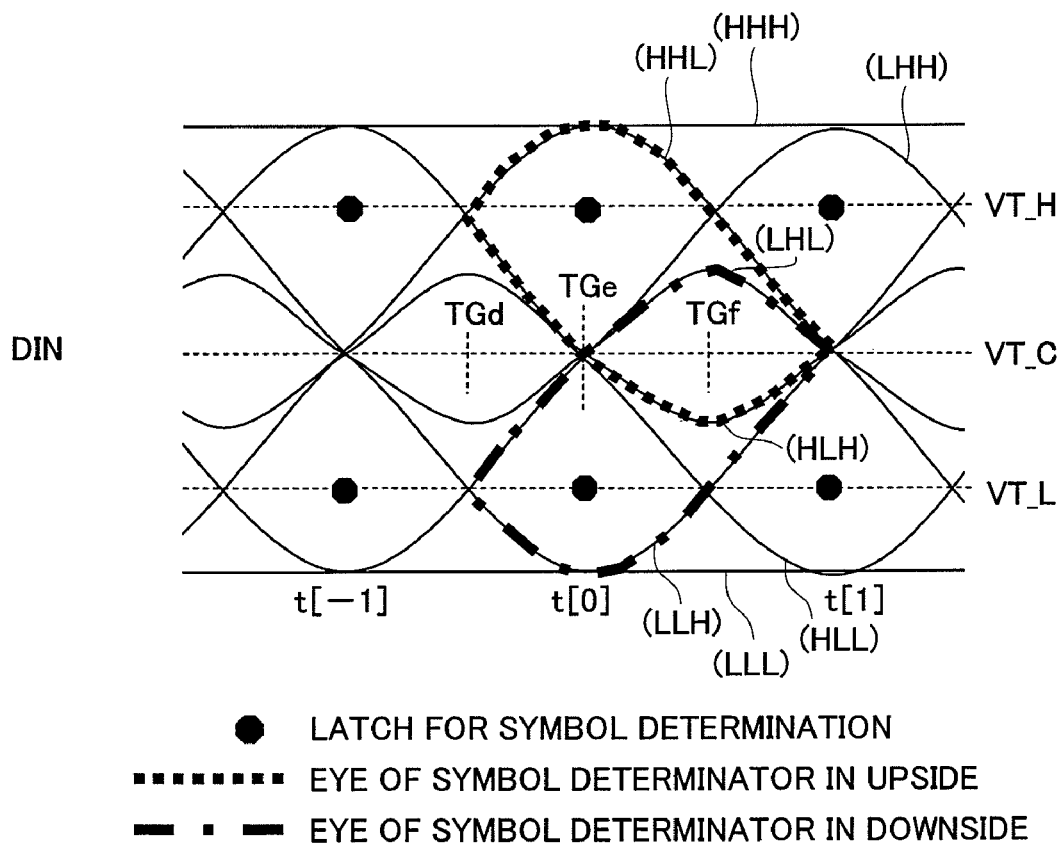
FIG. 19A is a waveform diagram showing operation of a data recovery circuit to an input data signal for explaining one example of operation using the semiconductor integrated circuit device shown in FIG. 18.
Figure 19B:
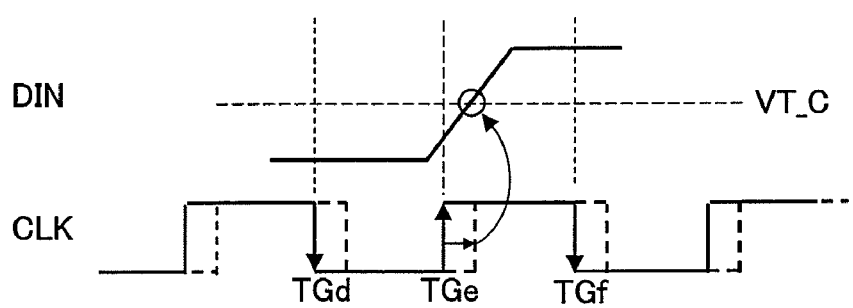
FIG. 19B is a waveform diagram showing operation of the clock recovery circuit for explaining one example of operation using the semiconductor integrated circuit device shown in FIG. 18.

For example, assuming that t[0] is the focused data cycle, when a symbol determination result at t[−1] is 'H', the result of the determination and the comparison by the VT_H is selected, and when the symbol determination result at t[−1] is 'L', the result of the determination and comparison by the VT_L is selected. Here, as a phase comparison method, a method (herein, called as "eye track method") described in Patent Document 1 described above is used, differently from the edge adjusting method described in FIG. 19. In the eye track method, as shown in FIG. 3A, latch timings for phase comparison (x marks) TGa and TGc are provided at positions spaced from latch timings for symbol determination (● mark) TGb by a predetermined time (here, set to ¼ of a data cycle time (=phase of 90°)), and a phase of clock is controlled such that all results of latching at the three timings become the same.

To explain conceptually, in a case where t[0] is set as the focused data cycle, as shown in FIG. 19, when the symbol determination result at t[−1] is 'H', an eye shown by a thick dotted line is opened, and control is performed so that all (● mark) and (x mark) at a VT_H position in the eye. Similarly, when the symbol determination result at t[−1] is 'L', an eye shown by a thick dashed-dotted line is opened, and control is performed so that all (● mark) and (x mark) at a VT_L position in the eye.

In order to perform phase comparison of the eye track method described above, in a configuration example shown in FIG. 2, operation shown in FIG. 3B is performed using two systems of clock signals the CLK_0 and the CLK_90. In the example shown in FIG. 3B, for example, assuming that the symbol determination result at the previous data cycle is 'H', phase comparison is performed at the VT_H position at the focused data cycle. Specifically, using the VT_H as a threshold, latching of the DIN is performed at the rising timing TGa of the CLK_90, at the next falling timing TGc, and at the rising timing TGb of the CLK_0. In this example, a latch result at the TGa is 'L', a latch result at the TGb is 'H' and a latch result at the TGc is 'H'. Accordingly, control is performed so as to shift the clock signals CLK_0 and CLK_90 rightward such that all the latch results become 'H'.

In the comparison circuit CMP21 in FIG. 2, a latch result at the TGa corresponds to output of the FF21, a latch result at the TGb corresponds to output of the FF20, and a latch result at the TGc corresponds to output of the FF22. When a comparison result of the output of the FF20 and the output of the FF21 at the EOR20 is inequality, the EARLY1 becomes 'H'. The EARLY in the eye track method means that the timing TGb and the like in FIGS. 3A and 3B are excessively shifted leftward. And therefore, when the symbol determination result at the previous data cycle is 'H' and 'H' of the EARLY1 is outputted to the EARLY via the selector circuit SEL, control is performed by the CLK_GEN so that the CLK_0 and the CLK_90 are shifted rightward.

On the other hand, when the comparison result of the output from the FF20 and the output from the FF22 at the EOR21 is inequality, the LATE1 becomes 'H'. The LATE in the eye track method means that the timing TGb and the like in FIGS. 3A and 3B are excessively shifted rightward. And therefore, when the symbol determination result at the previous data cycle is 'H' and 'H' of the LATE1 is outputted to the LATE via the selector circuit SEL, control is performed by the CLK_GEN so that the CLK_0 and the CLK_90 are shifted leftward. And, when data at the previous data cycle is 'H', the output of the FF20 (a latch result at the timing TGb shown in FIGS. 3A and 3B) is outputted via the SEL as the recovered data signal DATA. Note that, in the edge adjusting method such as described in FIG. 19B, control is performed so that a clock signal is shifted rightward when the LATE is generated, but a control direction is opposite thereto in the eye track method.

Similarly, in the comparison circuit CMP22, the results of latching at the TGa, the TGb and the TGc correspond to output of the FF24, the FF23 and the FF25, respectively. When a comparison result of the FF23 and the FF24 at the EOR22 is inequality, the EARLY0 becomes 'H', and when a comparison result of the FF23 and the FF25 at the EOR23 is inequality, the LATE0 becomes 'H'. Accordingly, when data at the previous data cycle is 'L' and 'H' of the EARLY0 or the LATE0 is outputted to the EARLY or the LATE via the SEL, phase control described above is performed by the CLK_GEN. Note that, when data at the previous data cycle is 'L', the DATA0 from the FF23 is outputted as the recovered data signal DATA via the SEL.

Figure 20:
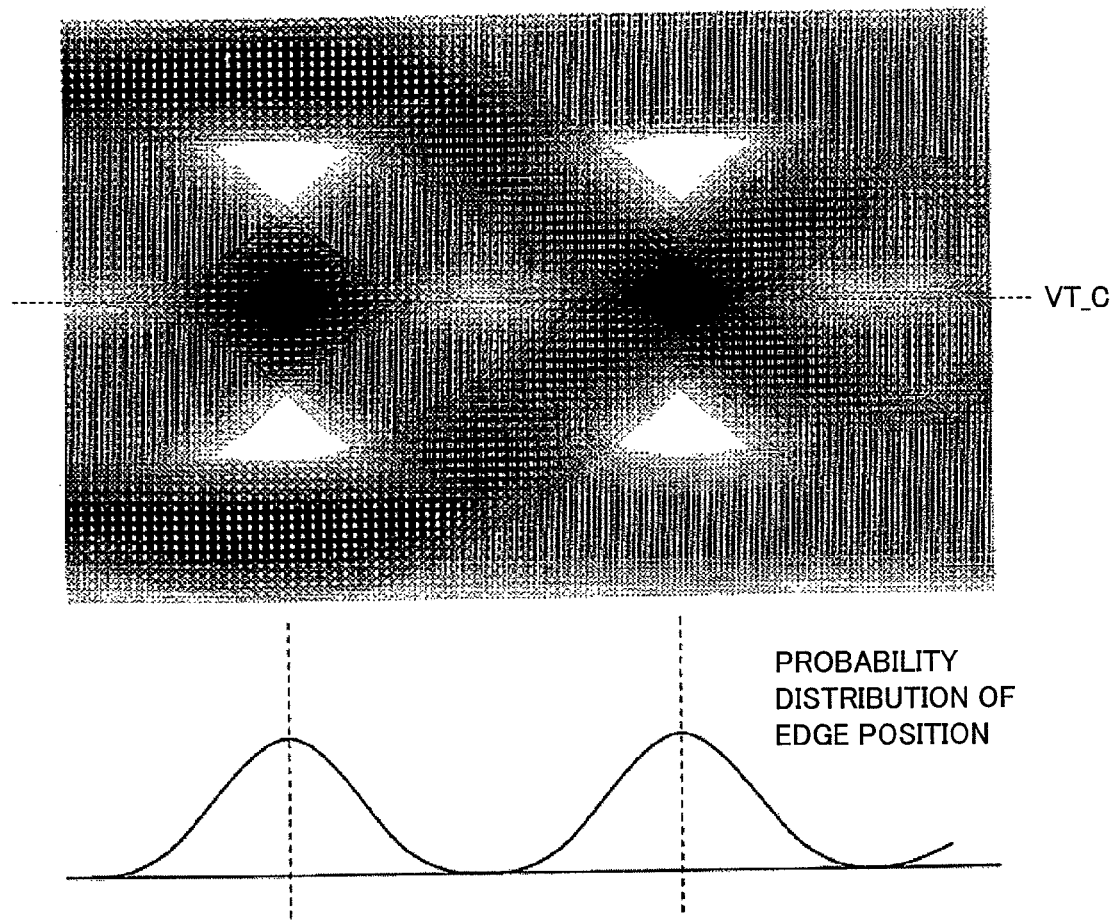
FIG. 20 is a waveform diagram showing an actual state of an eye pattern shown in FIG. 19A.
Figure 21:
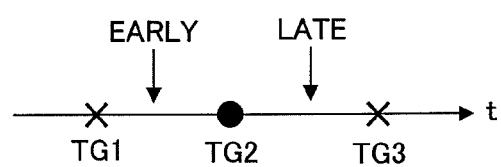
FIG. 21 is an explanation diagram showing definition of a phase comparison signal.

As described above, by using a configuration and operation shown in FIG. 2 and FIGS. 3A and 3B, a margin to waveform variations of the input data signals DIN can be improved. That is, for example, in FIG. 3A, when the symbol determination result at t[−1] is 'H', the phase comparison result is generated for a limited number of waveform orbits corresponding to the eye shown by a thick dotted line at a position of the threshold VT_H at t[0]. Accordingly, a variation amount of waveforms orbits relating to the phase comparison becomes relatively small as compared with the variation amount at the point of crossing on the VT_C on which almost all waveform orbits cross one another described in FIGS. 19A, 19B and FIG. 20, and phase variations of the recovered clock signals (CLK_0, CLK_90) outputted from the CLK_GEN become small.

In the phase comparison method in FIG. 2 and FIGS. 3A and 3B, as understood from FIG. 3A and the like, a method in which an eye shown by a thick dotted line is set as a target at the VT_H position and an eye shown by a thick dashed-dotted line is set as a target at the VT_L position and a phase of a clock signal is adjusted to a timing at which symbol determination can be conducted accurately while monitoring the respective eyes actually is employed. On the other hand, a phase comparison method described in FIGS. 19A, 19B and FIG. 20 can be mentioned as a method in which the phase of the clock signal is adjusted without monitoring the eyes actually. Accordingly, as compared with a phase comparison method described in FIGS. 19A, 19B and FIG. 20, the phase of the clock signal can be adjusted to a timing at which symbol determination can be performed more accurately.

Further, if the configuration and the operation shown in FIG. 2 and FIGS. 3A and 3B are used, set values of the thresholds VT_H and VT_L in FIGS. 3A and 3B can be set easily at arbitrary positions so that margins become large in respective eyes. For example, in a case of the VT_H, ideally, a set value in which the margin becomes a maximum in a time axis direction (a horizontal axis) is a set value passing a position where an orbit of (HHL) and an orbit of (LHH) crosses each other shown in FIGS. 19A and 19B. In this case, however, for example, if the orbit of (HHL) is fluctuated in a voltage direction (a vertical axis), there is a possibility that the margin to the vertical axis is reduced. In such a case, the set value of the VT_H is slightly reduced to approach an intermediate level (VT_C). In the configuration and the operation shown in FIG. 2 and FIGS. 3A and 3B, if the threshold VT_H is set by the VTSET_H, the clock signal CLK is automatically adjusted to a timing at which the margin can be secured in the time axis direction at the threshold, and therefore, arbitrary threshold can be set easily.

From the above, even if waveform variations occur in the DIN to a certain extent, a correct data signal or a correct clock signal can be recovered, and therefore, the margin to the waveform variations of the DIN can be improved.

Figure 13:
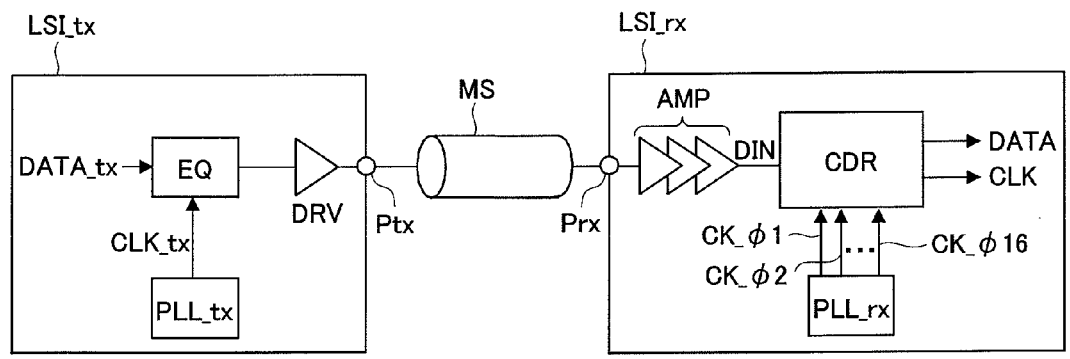
FIG. 13 is a schematic diagram showing a configuration example of a transmission system to which the semiconductor integrated circuit device shown in FIG. 1 is applied.

Next, an application example of the semiconductor integrated circuit device (clock and data recovery circuit CDR) shown in FIG. 1 is explained. FIG. 13 is a schematic diagram showing a configuration example of a transmission system in which the semiconductor integrated circuit device shown in FIG. 1 is applied. The transmission system shown in FIG. 13 is composed of a transmitting circuit LSI_tx, a receiving circuit LSI_rx and a transmission line MS connecting these circuits. The LSI_tx is composed of, for example, one semiconductor chip and outputs a transmission symbol sequence (transmission data) DATA tx in synchronization with a clock signal CLK_tx from an oscillating circuit for transmission PLL_tx. At this time, transmission-side equalization (transmission-side FFE: Feed Forward Equalization) is frequently conducted by a transmission-side equalizer EQ. A signal subjected to the equalization processing is outputted to the MS via a driver circuit DRV and an output pin Ptx.

On the other hand, the LSI_tx is composed of, for example, one semiconductor chip, and receives a signal transmitted via the MS from an input pin Prx. At this time, a reception signal from the Prx has a bipolar NRZ eye pattern described in FIG. 19 and the like. The reception signal is amplified by an amplifying circuit AMP and inputted into a clock and data recovery circuit CDR. The CDR has a configuration shown in FIG. 1 described above, and generates a recovered data signal DATA and a recovered clock signal CLK using one input data signal DIN. The generated signals are inputted into, for example, a FIFO (First In First Out) circuit (not shown) and the like, where the generated signals are synchronized with an internal clock signal of the LSI_tx.

Further, a plurality of (here, 16 phases) clock signals CLK_φ1 to CLK_φ16 having different phases are inputted from the oscillating circuit for reception PLL_rx into the CDR. Here, it is not always true that the oscillating frequencies of the PLL_tx and the PLL_rx completely coincide with each other. And therefore, the CDR sequentially selects one appropriate phase from the multi-phase clock signals CLK_φ1 to CLK_φ16 outputted from the PLL_rx based on the DIN to conduct recovery of the clock signal CLK. And simultaneously, symbol determination of the DIN (namely, recovery of a data signal DATA) is also performed.

Figure 14:
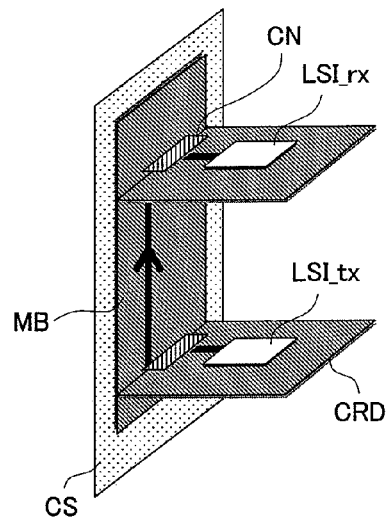
FIG. 14 is a perspective view showing one example of an implementing configuration of the transmission system in FIG. 13.

FIG. 14 is a perspective view showing one example of an implementing configuration of the transmission system shown in FIG. 13. FIG. 14 shows an internal configuration example of a system such as, for example, a server, an RAID (Redundant Array of Inexpensive Disks) or a router, and a back plane main board MB attached to a chassis CS of a server or the like, a plurality of daughter cards CRD connected to a plurality of connectors CN on the MB respectively and the like are included. One of the daughter cards CRD is provided with a transmitting circuit LSI_tx and another one is provided with a receiving circuit LSI_rx. Data transmission from the LSI_tx to the LSI_rx is performed via a transmission line on the MB. A length of the transmission line may have 1 meter or so, for example.

In such a case, high-speed communication can be realized by using a transmission method in which the abovementioned bipolar NRZ eye pattern is received in a reception circuit LSI_rx side. Further, by applying the configuration shown in FIG. 1 or the like to the clock and data recovery circuit CDR in the LSI_rx, a margin to jitter of a transmission waveform or the like can be improved and further speed-up can be achieved. Note that, data transmission on the back plane main board MB is described as an example here, however, the present invention is not limited to this example, of course. For example, the present invention can obtain a beneficial effect even in application to data transmission between LSIs on the same printed-circuit board using a transmission line having a length of 30 cm or so, application to data transmission using a coaxial cable having a length of 10 m or so and the like.

Figure 15:
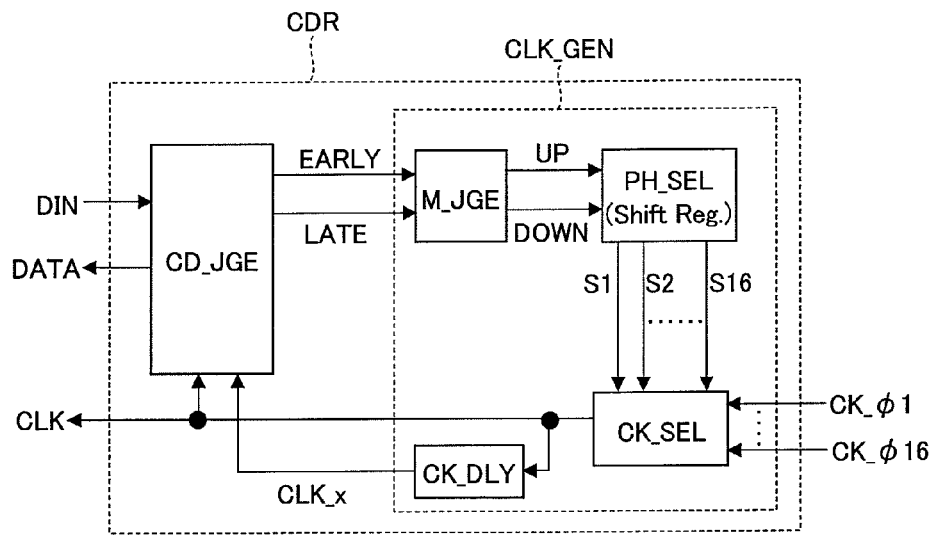
FIG. 15 is a block diagram showing a configuration example of a clock and data recovery circuit in the transmission system in FIG. 13.

FIG. 15 is a block diagram showing a configuration example of a clock and data recovery circuit in the transmission system shown in FIG. 13. The clock and data recovery circuit CDR shown in FIG. 15 is composed of a clock and data determination circuit CD_JGE receiving an input data signal DIN, a recovered clock signal CLK and the like and outputting a recovered data signal DATA and phase comparison signals EARLY and LATE, and a clock signal generating circuit CLK_GEN receiving the phase comparison signals and correcting the CLK. The CD_JGE is provided with a configuration and operation shown in FIG. 1 and the like. Here, one example of detailed configuration and operation of the CLK_GEN included in FIG. 1 and the like is explained.

The CLK_GEN includes a majority decision determination circuit M_JGE, a phase selection circuit PH_SEL, a clock signal selection circuit CK_SEL, a clock delay circuit CK_DLY and the like. The majority decision determination circuit M_JGE collects the phase comparison signals EARLY and LATE outputted from the CD_JGE for each data cycle over a plurality of data cycles and outputs phase control signals UP or DOWN by making majority decision determination to the collected phase comparison signals EARLY and LATE. For example, when the number of occurrence times of the EARLY is larger than that of the LATE, the DOWN serving as a control signal for delaying a phase of the CLK is outputted. In a reverse case, the UP serving as a control signal for advancing the phase of the CLK is outputted.

The phase selection circuit PH_SEL is composed of, for example, a shift register of 16 bits and the like, and performs operation of rightward shift at input of the UP and leftward shift at input of the DOWN. One of selection signals S1 to S16 corresponding to 16 bits outputted by the PH_SEL is activated and a position of the activated selection signal moves according to the rightward shift or the leftward shift. The clock signal selection circuit CK_SEL selects a clock signal of one phase corresponding to the selection signals S1 to S16 from clock signals CK_φ1 to CK_φ16 of 16 phases from the oscillating circuit for signal reception PLL_tx in FIG. 13 and outputs the selected one as the recovered clock signal CLK. And, for example, as shown in FIG. 2, in a case where two clock signals CLK_0 and CLK_90 are inputted to the CD_JGE, the clock delay circuit CK_DLY adds a predetermined delay to the recovered clock signal CLK and supply the same to the CD_JGE.

Figure 16:
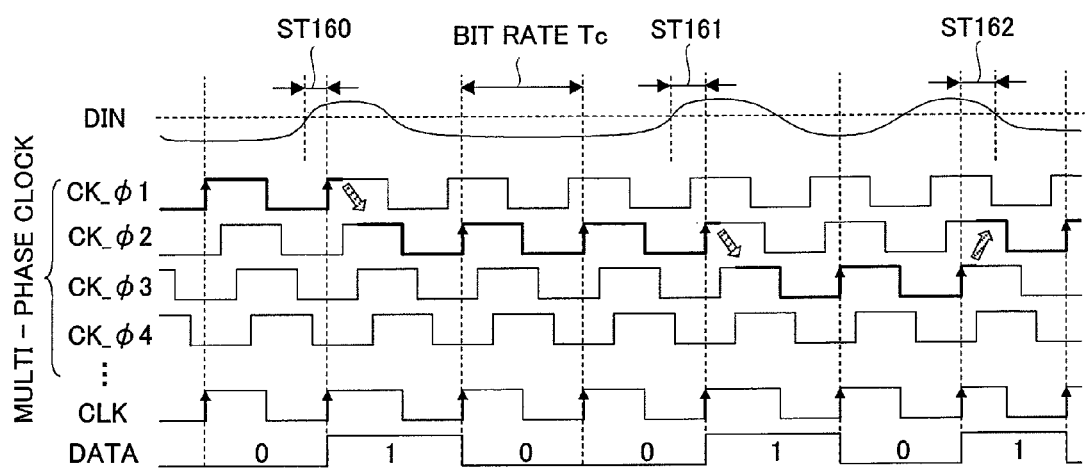
FIG. 16 is a schematic diagram explaining one example of operation of a clock signal generating circuit in the clock and data recovery circuit in FIG. 15.

FIG. 16 is a schematic diagram explaining one example of operation of a clock signal generating circuit in the clock and data recovery circuit shown in FIG. 15. The clock and data recovery circuit CLK_GEN receives the phase comparison signals EARLY and LATE and performs selecting operation selecting one phase from the multi-phase clock signals CK_φ1 to CK_φ16 so that symbol determination can be performed always at a center of the eye. The CK_φ1 to CK_φ16 are clock signals in which CLK_φ[n+1] is shifted with respect to CLK_φ[n] in the same direction by a predetermined phase (here, 22.5 (360/16) degrees). Hereinafter, a case in which phase comparison in the eye track method described in FIGS. 3A and 3B is performed is explained as an example.

In the eye track method, when a rising timing of the recovered clock signal CLK (namely, a timing of symbol determination) and an edge in an input data signal waveform (DIN waveform) are too close, selection is performed with shifting multi-phase clock signals sequentially so that the rising timing is kept away from the edge. In the example shown in FIG. 16, the clock signal CLK_φ1 is selected first. Thereafter, in ST160, if a rising timing of the recovered clock signal CLK and a rising edge of the DIN approach each other, the EARLY is outputted from the CD_JGE and the DOWN is outputted from the M_JGE. Thereby, the CK_SEL selects the clock signal CLK_φ2 via the PH_SEL and outputs the CLK_φ2 as the recovered clock signal CLK.

Thereafter, also in ST161, it is determined that a rising timing of the CLK and a rising edge of the DIN are close to each other, and the CK_SEL selects the clock signal CLK_φ3 and outputs the CLK_φ3 as the recovered clock signal CLK in the same manner. On the other hand, in ST162, if the rising timing of the CLK and a falling edge of the DIN approach each other, the LATE is outputted from the CD_JGE and the UP is outputted from the M_JGE. Thereby, the CK_SEL selects the clock signal CLK_φ2 via the PH_SEL and outputs the CLK_φ2 as the recovered clock signal CLK.

Figure 17:
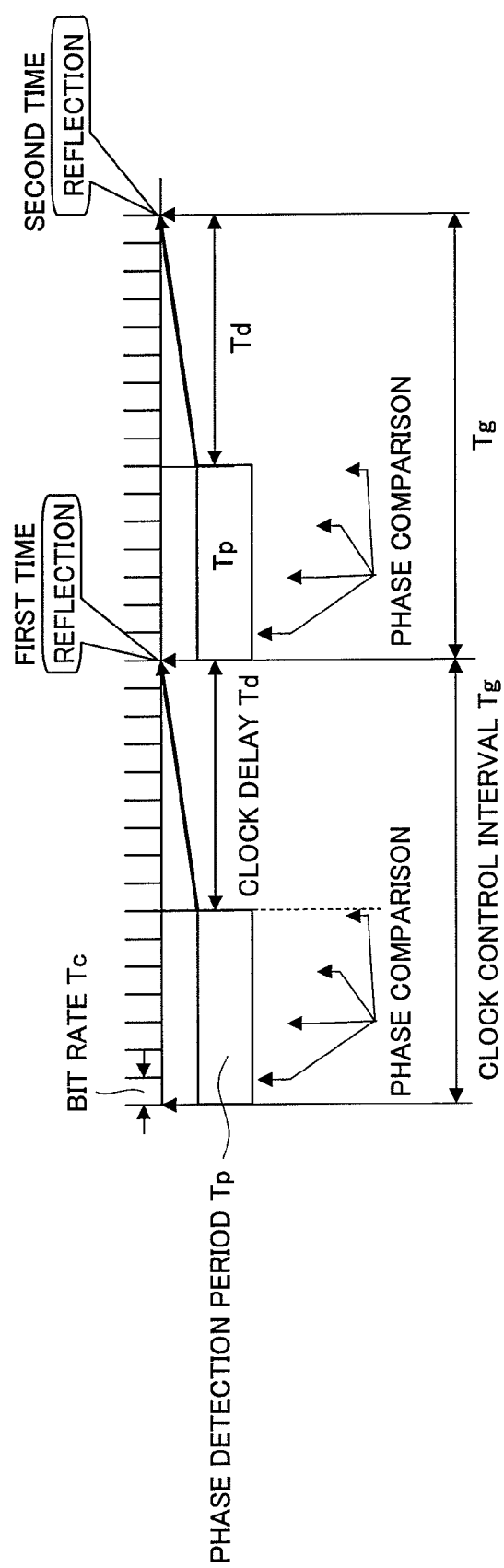
FIG. 17 is an explanatory diagram for complementing the operation in FIG. 16.

Note that, in FIG. 16, operation in which a result of phase comparison conducted at a certain data cycle (bit rate Tc) is immediately reflected is explained for easy explanation, however, in practice, operation shown in FIG. 17 is actually performed, for example. FIG. 17 is an explanation diagram for complementing the operation shown in FIG. 16. In FIG. 17, a plurality of data cycles (a plurality of bit rates Tc) is defined as a phase detection period Tp, and phase comparison results at the respective data cycles are averaged within the period Tp. This corresponds to the operation of the majority decision determination circuit M_JGE in FIG. 15. Further, a averaged result is reflected to the recovered clock signal CLK after a time (clock delay Td) required for new selection of the clock signal CK elapses. Accordingly, the phase of the recovered clock signal CLK is corrected for each clock control interval Tg corresponding to Tp+Td.

As described above, a margin to waveform variations of input data signals can be improved by using the semiconductor integrated circuit device according to the first embodiment.

And, high-speed transmission can be realized by applying the semiconductor integrated circuit device according to the first embodiment to a transmission system.

Second Embodiment

In a second embodiment, a specific configuration example different from that in FIG. 2 in the semiconductor integrated circuit device shown in FIG. 1 is explained. In FIG. 2 described above, a configuration called full-rate in which symbol determination and the like are performed using a rising timing of the clock signal CLK_0 at each data cycle is described. A main feature of a semiconductor integrated circuit device according to the second embodiment is that a configuration called half-rate is employed, differently from the configuration in FIG. 2. In a half-rate configuration, a frequency of a clock signal is reduced to a half, and symbol determination and the like are performed using both timings of rising and falling.

Figure 4A:
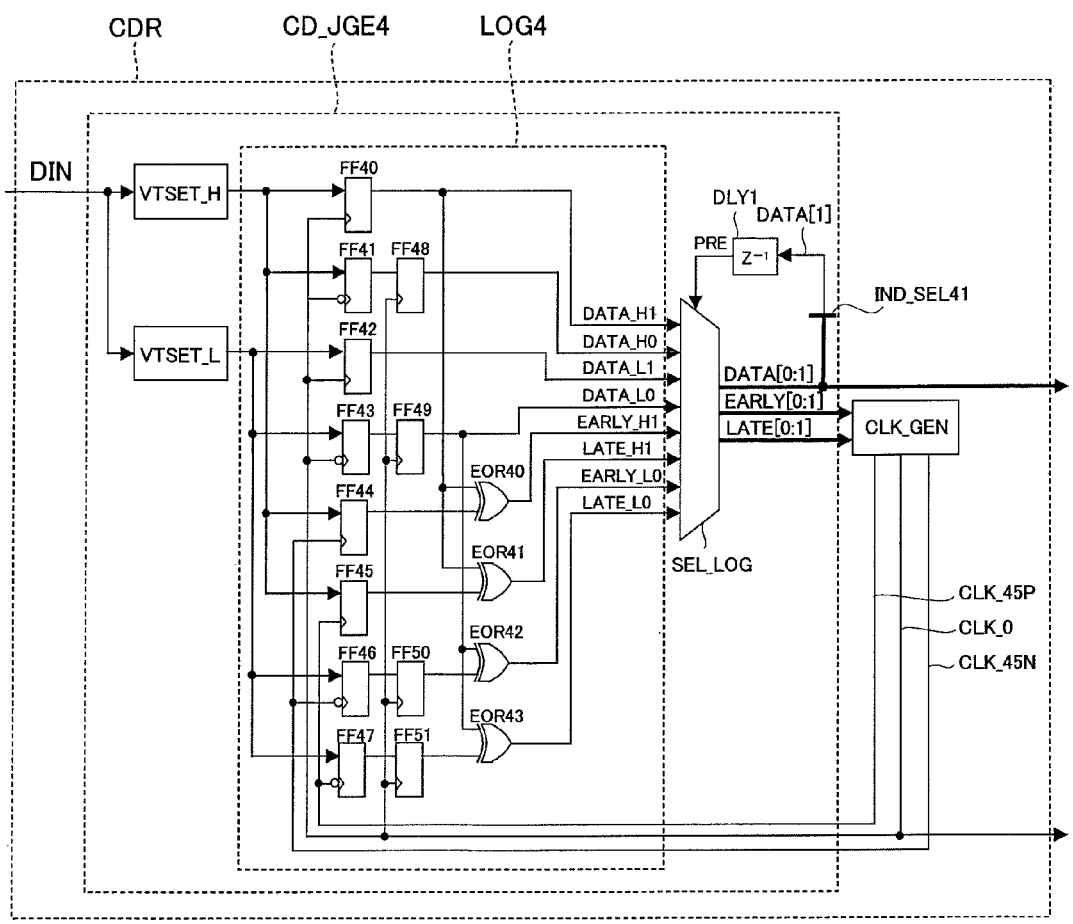
FIG. 4A is a circuit diagram showing a configuration example of a semiconductor integrated circuit device according to a second embodiment of the present invention in FIG. 1, for showing a detail thereof.
Figure 4B:
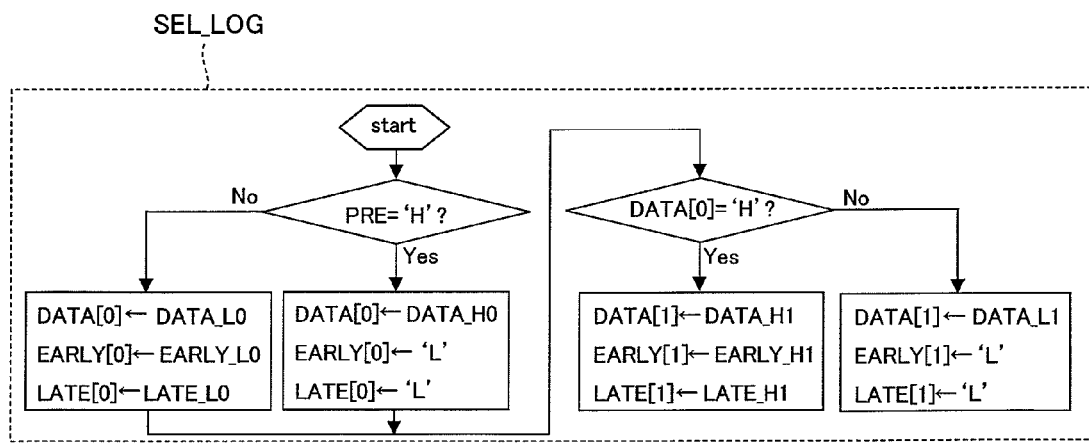
FIG. 4B is an explanation diagram showing a logic content of a selector logic circuit in FIG. 4A.
Figure 5A:
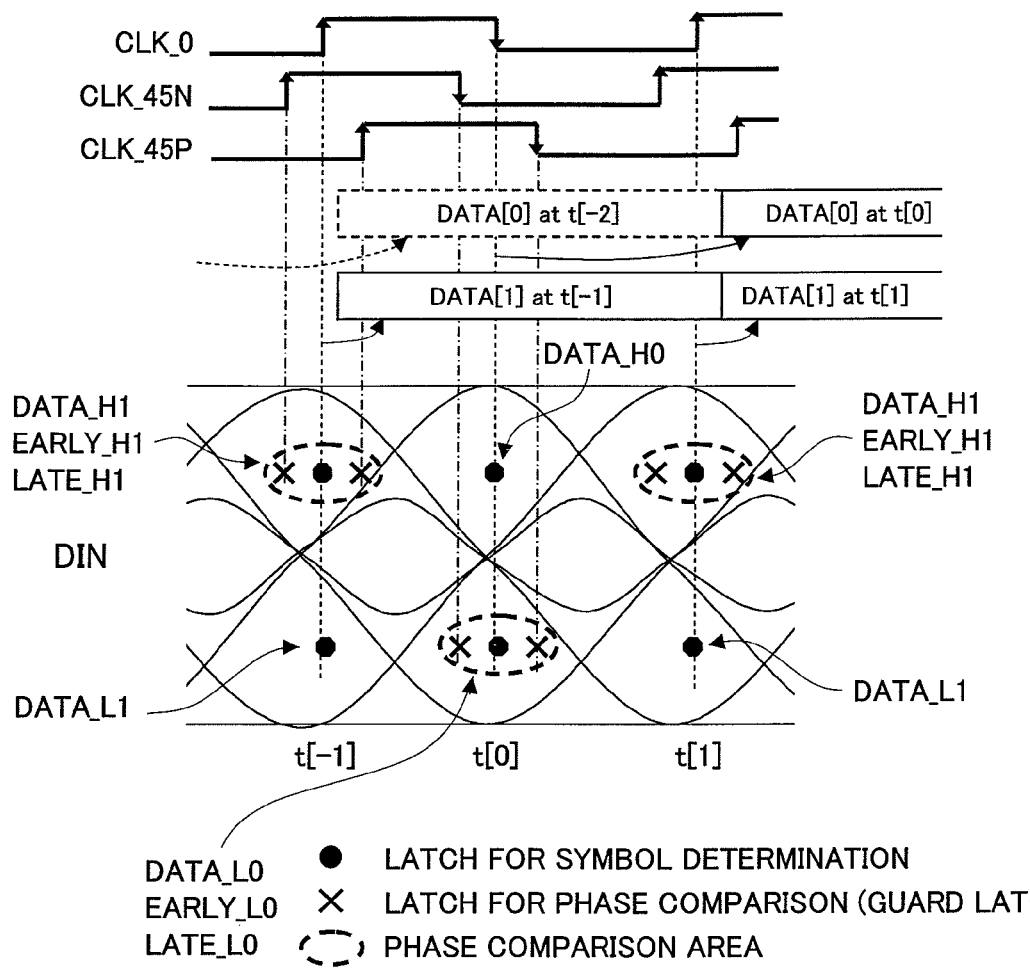
FIG. 5A is a waveform diagram for explaining an operation example of symbol determination and phase comparison in a case where a half-rate configuration is employed in the semiconductor integrated circuit device according to the second embodiment of the present invention and showing an operation example shown in FIGS. 4A and 4B.
Figure 5B:
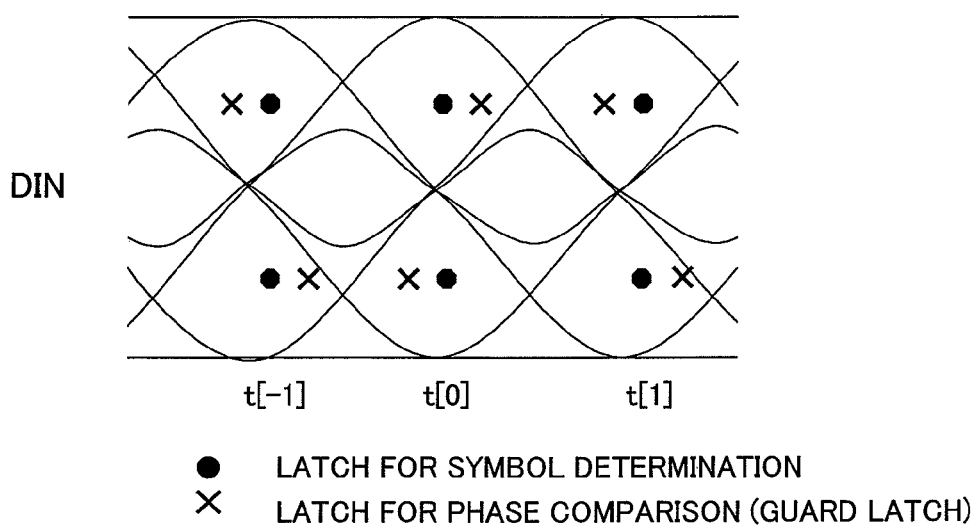
FIG. 5B is a waveform diagram for explaining an operation example of symbol determination and phase comparison in a case where the half-rate configuration is employed in the semiconductor integrated circuit device according to the second embodiment of the present invention and showing an operation example other than that shown in FIG. 5A.

FIGS. 4A and 4B show details of FIG. 1 in the semiconductor integrated circuit device according to the second embodiment of the present invention, FIG. 4A is a circuit diagram showing a configuration example thereof and FIG. 4B is an explanation diagram showing a logic content of a selector logic circuit in FIG. 4A. FIGS. 5A and 5B are waveform diagrams for explaining operation examples of symbol determination and phase comparison in a case where the half-rate configuration is used in the semiconductor integrated circuit device according to the second embodiment of the present invention, FIG. 5A shows an operation example of FIGS. 4A and 4B, and FIG. 5B shows another operation example.

For easy understanding, operation in a case where the half-rate configuration is used is explained first with reference to FIGS. 5A and 5B. In the half-rate configuration, as shown in the bipolar NRZ eye pattern of the input data signal DIN in FIG. 5A, operation in which phase comparison is omitted partially is performed. In the full-rate configuration shown in FIG. 3A, both phase comparison in the threshold VT_H side and in the threshold VT_L side is performed at all the data cycles t[−1], t[0] and t[1], on the other hand, in FIG. 5A, phase comparison in the VT_H side is performed at data cycles t[−1] and t[1], and phase comparison in the VT_L side is performed at data cycle t[0]. That is, phase comparison at each threshold is performed at every other data cycle, and phase comparison is performed by only one of the thresholds for each data cycle.

And, as shown in the clock signal CLK_0 in FIG. 5A, a frequency of the clock signal is a half of those in FIG. 2 and FIGS. 3A and 3B, and, for example, at t[−1], symbol determination latch is performed at a rising timing, and at next t[0], symbol determination latch is performed at a falling timing. By using such a half-rate configuration, an internal operation speed becomes a half of the full-rate configuration, and therefore, power saving, and in some instances, area saving, can be achieved. Further, by omitting phase comparison partially, it is made possible to achieve further power saving and area saving.

FIG. 5B shows operation in which a part of phase comparison is further omitted from that in FIG. 5A. In the operation in FIG. 5B, one latch for phase comparison is omitted from each of the VT_H side and the VT_L side for each data cycle. And, in each threshold, a latch for phase comparison on a front side and a latch for phase comparison on rear side are alternately omitted for each data cycle, and at respective data cycles, positions of latch omitted for respective thresholds are different. And thereby, in the VT_H side, comparison of only the EARLY is performed at t[−1] and comparison of only the LATE is performed at t[0], and in the VT_L side, comparison of only the LATE is performed at t[−1] and comparison of only the EARLY is performed at t[0].

As a configuration realizing such operation, FIG. 5A is taken as a representative here, and a configuration example thereof is explained with reference to FIGS. 4A and 4B. The semiconductor integrated circuit device shown in FIG. 4A is composed of a clock and data determination circuit CD_JGE4 and a clock signal generating circuit CLK_GEN. The CD_JGE4 includes threshold setting circuits VTSET_H and VTSET_L, a logic circuit LOG4, a selector logic circuit SEL_LOG, a bus signal selection circuit IND_SEL41, and an one-cycle delay circuit DLY1. The VTSET_H and the VTSET_L are similar to those in the first embodiment.

The logic circuit LOG4 includes twelve latch circuits FF40 to FF51 and four EXOR circuits EOR40 to EOR43. The FF40 latches output of the VTSET_H at rising of the clock signal CLK_0 from the CLK_GEN and outputs a latch result to the SEL_LOG as the signal DATA_H1. The FF41 latches output of the VTSET_H at falling of the CLK_0, a latch result is latched again at rising of the CLK_0 by the FF48 and a latch result of the FF48 is outputted to the SEL_LOG as the signal DATA_H0. The FF42 latches output of the VTSET_L at rising of the CLK_0 and outputs a latch result to the SEL_LOG as the signal DATA_L1. The FF43 latches output of the VTSET_L at falling of the CLK_0, a latch result is latched again at rising of the CLK_0 by the FF49 and a latch result of the FF49 is outputted to the SEL_LOG as the signal DATA_L0.

The FF44 latches output of the VTSET_H at rising of a clock signal CLK_45N from the CLK_GEN and outputs a latch result to the EOR40. The FF45 latches output of the VTSET_H at rising of a clock signal CLK_45P from the CLK_GEN and outputs a latch result to the EOR41. The FF46 latches output of the VTSET_L at falling of the CLK_45N, a latch result is latched again at rising of the CLK_0 by the FF50 and a latch result of the FF50 is outputted to the EOR42. The FF47 latches output of the VTSET_L at falling of the CLK_45P, a latch result is latched again at rising of the CLK_0 by the FF51 and a latch result of the FF51 is outputted to the EOR43.

The EOR40 performs an EXOR operation of the latch result of the FF40 and the latch result of the FF44 and outputs a result of the operation to the SEL_LOG as the signal EARLY_H1. The EOR41 performs an EXOR operation of the latch result of the FF40 and the latch result of the FF45 and outputs a result of the operation to the SEL_LOG as the signal LATE_H1. The EOR42 performs an EXOR operation of the latch result of the FF49 and the latch result of the FF50 and outputs a result of the operation to the SEL_LOG as the signal EARLY_L0. The EOR43 performs an EXOR operation of the latch result of the FF49 and the latch result of the FF51 and outputs a result of the operation to the SEL_LOG as the signal LATE_L0.

Each input signal to the SEL_LOG described above corresponds to each latch position shown in FIG. 5A. First, in "H0" of the DATA_H0 and the like, "H" means the threshold VT_H side and "0" means data cycles (t[−2], t[0], t[2], . . . ) latched at falling of the CLK_0. And, in "L1" of the DATA_L1 and the like, "L" means the threshold VT_L side and "1" means data cycles (t[−1], t[1], t[3], . . . ) latched at rising of CLK_0.

In FIG. 5A, since symbol determination is performed in the VT_H side and in the VT_L side at all data cycles, the DATA_H0 and the DATA_L0 are outputted at a data cycle of falling of the CLK_0 and the DATA_H1 and the DATA_L1 are outputted at a data cycle of rising of the CLK_0. On the other hand, as described above, since phase comparison is partially omitted, at a data cycle of falling of the CLK_0, the EARLY_L0 and the LATE_L0 corresponding to phase comparison results in only the VT_L side are outputted, and at a data cycle of rising of the CLK_0, the EARLY_H1 and the LATE_H1 corresponding to a phase comparison results in only the VT_H side are outputted.

Note that, the EARLY_L0 and the LATE_L0 are obtained by conducting comparison operation between results of latching at falling of the CLK_0 (for example, corresponding to ● mark in the VT_L side of t[0]) and results of latching at falling of the CLK_45N and the CLK_45P adjacently positioned on both sides of the CLK_0 with a phase shifted by 45 degree (for example, corresponding to x mark in the VT_L side of t[0]), respectively. Similarly, the EARLY_H1 and the LATE_H1 are obtained by conducting comparison operation between results of latching at rising of the CLK_0 (for example, corresponding to ● mark in the VT_H side of t[1]) and results of latching at rising of the CLK_45N and the CLK_45P (for example, corresponding to x mark in the VT_H side of t[1]), respectively.

The selector logic circuit SEL_LOG shown in FIG. 4A receives input signals described above and performs selecting operation and the like and outputs a recovered data signal DATA[0:1] and phase comparison signals EARLY[0:1], LATE[0:1]. The DATA[0], the EARLY[0] and the LATE[0] correspond to a symbol determination result and a phase comparison result at a data cycle of falling of the CLK_0, and the DATA[1], the EARLY[1] and the LATE[1] correspond to a symbol determination result and a phase comparison result at a data cycle of rising of the CLK_0.

Here, operation such as selection in the SEL_LOG is performed based on a symbol determination result at a previous data cycle in the same manner as the first embodiment. In FIG. 5A, first, as for the symbol determination, for example, if a symbol determination result (PRE) at t[−1] is 'H', a symbol determination result (DATA[0]) at t[0] is the DATA_H0. On the contrary, if the symbol determination result (PRE) at t[−1] is 'L', the DATA[0] is the DATA_L0. And, if a symbol determination result (DATA[1]) at t[0], namely, the DATA[0] just determined is 'H', the symbol determination result (DATA[1]) at t[1] is the DATA_H1, and on the contrary, if the symbol determination result (DATA[1]) at t[0] is 'L', the DATA[1] is the DATA_L1.

Meanwhile, as for the phase comparison, for example, if a symbol determination result at t[−1], namely, the DATA[1] at a previous clock cycle is 'H', 'L' is outputted at t[0] as the EARLY[0] and the LATE[0] without performing phase comparison. On the contrary, if the symbol determination result at t[−1], namely, the DATA[1] at the previous clock cycle is 'L', phase comparison is performed at t[0] and the EARLY_L0 is outputted as the EARLY[0] and the LATE_L0 is outputted as the LATE[0]. And if the symbol determination result at t[0], namely, the DATA[0] at this clock cycle is 'H', phase comparison is performed at t[1] and the EARLY_H1 is outputted as the EARLY[1] and the LATE_H1 is outputted as the LATE[1]. On the contrary, if the symbol determination result at t[0], namely, the DATA[0] at this clock cycle is 'L', 'L' is outputted as the EARLY[1] and the LATE[1] at t[1] without performing phase comparison.

In order to perform such operation, in the SEL_LOG, as shown in FIG. 4A, only the DATA[1] is selected from the DATA[0:1] by the IND_SEL41 and selecting operation and the like are performed using the signal PRE obtained by delaying the DATA[1] by the DLY1 by one clock cycle.

In FIG. 4B, operation (logic content) of the selector logic circuit SEL_LOG described above is shown. The signal PRE is a signal obtained by delaying the DATA[1] by the DLY1. First, if the PRE is 'H', the SEL_LOG outputs DATA[0]=DATA_H0 and EARLY[0]=LATE[0]='L', and if the PRE is 'L', the SEL_LOG outputs DATA[0]=DATA_L0, EARLY[0]=EARLY_L0, and LATE[0]=LATE_L0. Next, if the DATA[0] just determined is 'H', the SEL_LOG outputs DATA[1]=DATA_H1, EARLY[1]=EARLY_H1, and LATE[1]=LATE_H1, and if the DATA[0] just determined is 'L', the SEL_LOG outputs DATA[1]=DATA_L1 and EARLY[1]=LATE[1]='L'.

As described above, by using the semiconductor integrated circuit device according to the second embodiment, a margin to waveform variations of input data signals can be improved even in the half-rate configuration in the same manner as the first embodiment. And, by applying the semiconductor integrated circuit device according to the second embodiment to a transmission system, high-speed transmission can be realized. Note that, needless to say, the present invention can be applied not only to the full-rate configuration and the half-rate configuration explained above but also to a quad-rate configuration using a half frequency of the frequency used in the half-rate configuration and the like.

Third Embodiment

In a third embodiment, a detailed configuration example different from that in FIG. 2 in the semiconductor integrated circuit device shown in FIG. 1 is explained. A main feature of a semiconductor integrated circuit device according to the third embodiment is that a symbol determination result and a phase comparison result at a focused data cycle are generated using latch result at a focused data cycle and at a next data cycle in addition to a symbol determination result at a previous data cycle.

Figure 6A:
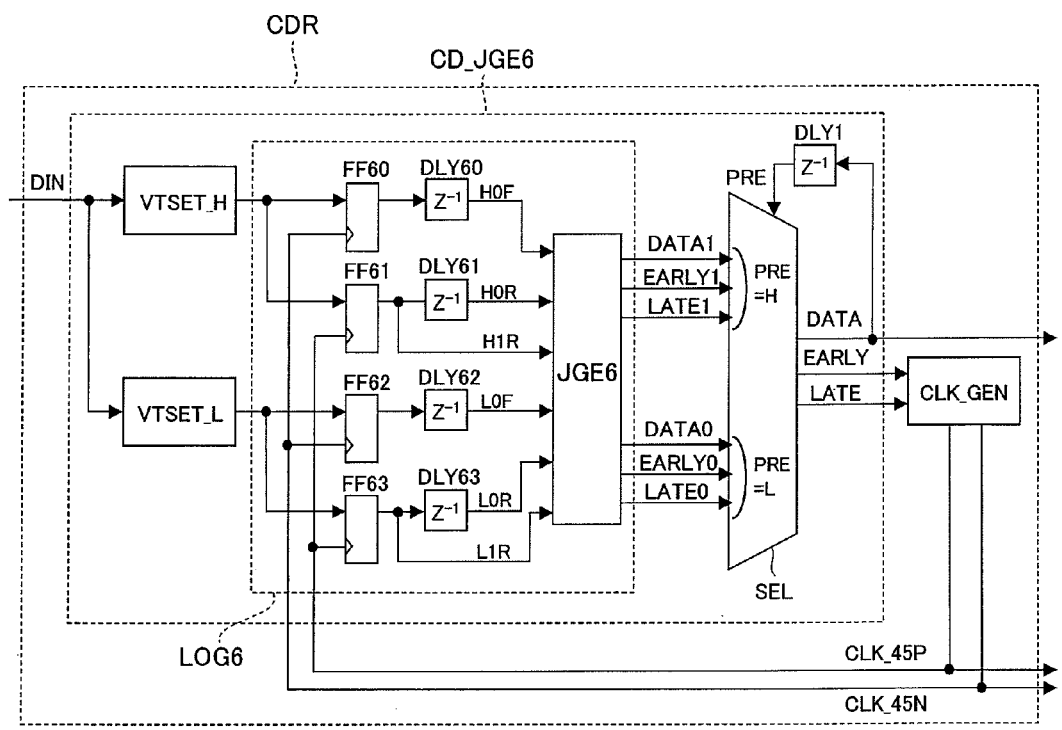
FIG. 6A is a circuit diagram showing a detail of the circuit shown in FIG. 1 and showing an example of a configuration of a semiconductor integrated circuit device according to a third embodiment.
Figure 6B:
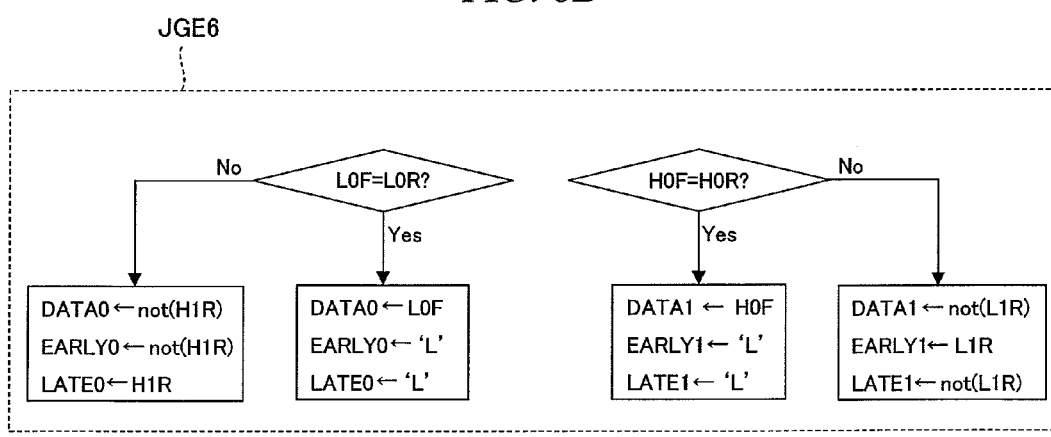
FIG. 6B is a diagram showing a detail of the circuit shown in FIG. 1 and explaining a logic content in a determination processing circuit in FIG. 6A of the semiconductor integrated circuit device according to the third embodiment.

FIGS. 6A and 6B show details of FIG. 1 in the semiconductor integrated circuit device according to the third embodiment of the present invention, FIG. 6A is a circuit diagram showing a configuration example thereof and FIG. 6B is an explanation diagram showing a logic content of a determination processing circuit in FIG. 6A. The semiconductor integrated circuit device shown in FIGS. 6A and 6B is different from the semiconductor integrated circuit device shown in FIG. 2 in an interior of a logic circuit LOG6 included in a clock and data determination circuit CD_JGE6 and in that the clock signal generating circuit CLK_GEN generates clock signals CLK_45P and CLK_45N. The other configuration of the semiconductor integrated circuit device according to the third embodiment is similar to that of the semiconductor integrated circuit device shown in FIG. 2, and therefore, detailed explanation thereabout is omitted.

The logic circuit LOG6 is composed of four latch circuits FF60 to FF63, four one-cycle delay circuits DLY60 to DLY63, and a determination processing circuit JGE6. The FF60 latches output of a threshold setting circuit VTSET_H at rising of the CLK_45N and transmits a latch result to the JGE6 via the DLY60 as the signal H0F. The FF61 latches output of the VTSET_H at rising of the CLK_45P, transmits a latch result to the JGE6 as it is as the signal H1R and transmits the latch result to the JGE6 via the DLY61 as the signal H0R.

The FF62 latches output of a threshold setting circuit VTSET_L at rising of the CLK_45N and transmits a latch result to the JGE6 via the DLY62 as the signal L0F. The FF63 latches output of the VTSET_L at rising of the CLK_45P and transmits a latch result to the JGE6 as it is as the signal L1R and to the JGE6 via the DLY63 as the signal L0R. The JGE6 receives these signals H0F, H0R, H1R, L0F, L0R, and L1R, performs a determination processing shown in FIG. 6B and outputs two kinds of candidates {(DATA1, EARLY1, LATE1) or (DATA0, EARLY0, LATE0)} composed of combination of a data signal and phase comparison signals.

Figure 8A:
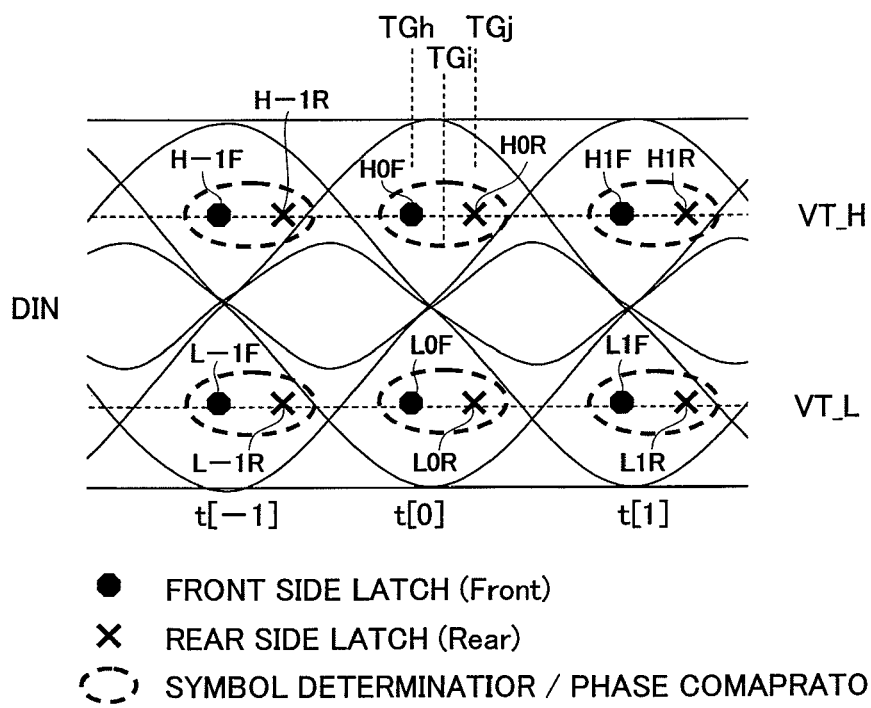
FIG. 8A is a waveform diagram showing an operation example in the semiconductor integrated circuit device shown in FIGS. 5A and 5B and explaining operation of symbol determination and phase comparison to the waveform.
Figure 8B:
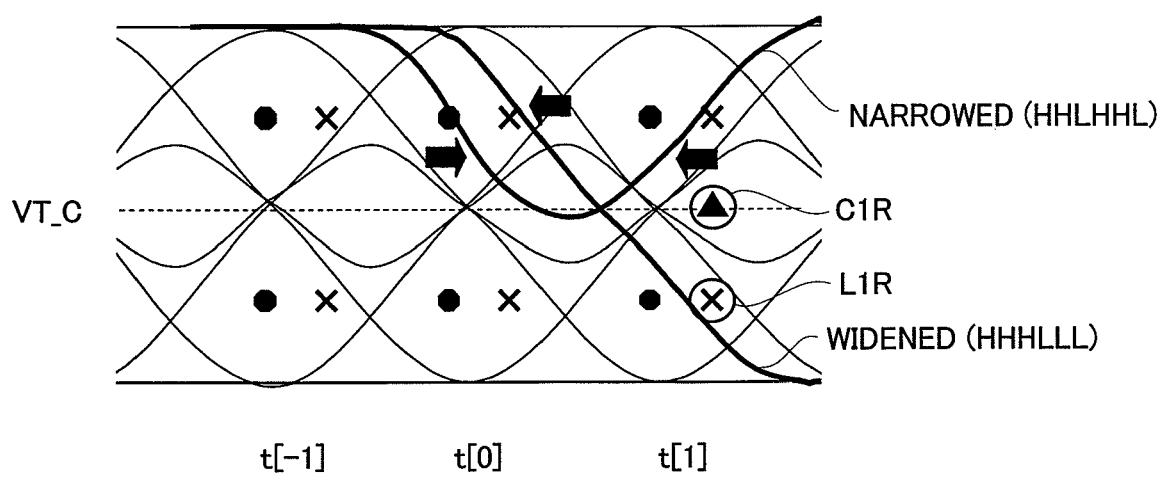
FIG. 8B is a waveform diagram showing an operation example in the semiconductor integrated circuit device shown in FIGS. 5A and 5B and explaining the operation of symbol determination and phase comparison to the waveforms.

FIGS. 8A and 8B are waveform diagrams showing operation examples of the semiconductor integrated circuit device shown in FIGS. 5A and 5B. FIGS. 8A and 8B are diagrams for explaining operations of symbol determination and phase comparison to the waveform. The signals H0F, H0R, H1R, L0F, L0R, and L1R in FIG. 6A correspond to latch results at positions shown in FIG. 8A.

For example, in the H0F, "H" means a threshold VT_H side, "0" means a data cycle t[0] and "F" means a timing on a front side (a timing TGh in FIG. 8A). And, for example, in the L1R, "L" means a threshold VT_L side, "1" means a data cycle t[1] and "R" means a timing on a rear side (a timing TGj in FIG. 8A) The same is true in other signals. Here, the TGh is positioned at a position shifted to a left side by 45 degrees with respect to the TGj, which corresponds to a rising timing of the CLK_45N in FIG. 6A. On the other hand, TGj is positioned at a position shifted to a right side by 45 degrees with respect to the TGi, which corresponds to a rising timing of the CLK_45P in FIG. 5A.

Now, a symbol sequence having the highest band in a bipolar NRZ eye pattern is (LLHLLH . . . ) or (HHLHHL . . . ). Accordingly, as shown in FIG. 8B, for example, if random jitter enters from an oscillating circuit for transmission PLL_tx or the like into the symbol sequence, a possibility that a pulse width of such a symbol sequence becomes narrower than that of original is increased. On the other hand, if random jitter enters into a pulse with a low band such as (HHHLLLHHH), a possibility that a pulse width is widened is increased. And therefore, for example, in the VT_H side of t[0], if latch results at the H0F and the H0R are different, determination whether a pulse width of (HHLHHL . . . ) is narrowed or a pulse width of (HHHLLLL-HHH) is widened can be made using a latch result at t[1]. For example, using the L1R at t[1], if a latch result thereof is 'H', determination that the pulse width of (HHLHHL . . . ) is narrowed is made, and if the result is 'L', determination that the pulse width of (HHHLLLLHHH) is widened is made.

Using such a method of thinking, the symbol determination result and the phase comparison result at t[0] can be defined as following.

First, condition at a data cycle t[−1] is classified to {symbol determination result at t[−1] is 'H'} (condition 1) or {symbol determination result at t[−1] is 'L'} (condition 2). Next, the (condition 1) is classified to {results of previous latching and next latching (latch results at the H0F and the H0R) are the same} (condition 1-1) or {results of previous latching and next latching (latch results at the H0F and the H0R) are different} (condition 1-2) at t[0]. In the same manner, the (condition 2) is classified to {results of previous latching and next latching (latch results at the H0F and the H0R) are the same} (condition 2-1) or {results of previous latching and next latching (latch results at the H0F and the H0R) are different} (condition 2-2) at t[0]. Note that, as described in FIG. 1 and the like, if (condition 1) is satisfied, a latch result (L0F, L0R) at the VT_L is not used at t[0], and if (condition 2) is satisfied, a latch result (H0F, H0R) at the VT_H is not used at t[0].

In a case where (condition 1) and (condition 1-1) are satisfied under these conditions, the latch result at the H0F (or the H0R) can be considered as the symbol determination result, and therefore, it is unnecessary to generate the phase comparison signals EARLY1, LATE1. On the other hand, in a case where (condition 1) and (condition 1-2) are satisfied, as understood from the abovementioned explanation, if a latch result at the L1R of t[1] is 'H', 'L' is outputted as the symbol determination result (DATA1) and EARLY1='H' is outputted as the phase comparison result. On the contrary, if the latch result at the L1R is 'L', 'H' is outputted as the symbol determination result (DATA1) and LATE1='H' is outputted as the phase comparison result.

And, in a case where (condition 2) and (condition 2-1) are satisfied, a latch result at the L0F (or the L0R) can be considered as the symbol determination result, and therefore, it is unnecessary to generate the phase comparison signals EARLY0 and LATE0. On the other hand, in a case where (condition 2) and (condition 2-2) are satisfied, as understood from the abovementioned explanation, if a latch result at the H1R of t[1] is 'H', 'L' is outputted as the symbol determination result (DATA0) and LATE0='H' is outputted as the phase comparison result. On the contrary, if the latch result at the H1R is 'L', 'H' is outputted as the symbol determination result (DATA0) and EARLY0='H' is outputted as the phase comparison result.

In order to perform such operation, in FIGS. 5A and 5B, discrimination between (condition 1) and (condition 2) is performed by the selector circuit SEL and the one-cycle delay circuit DLY1, and discrimination between (condition 1-1) and (condition 1-2) and discrimination between (condition 2-1) and (condition 2-2) are performed by the logic circuit JGE5. In the JGE5, for example, if (condition 1) and (condition 1-2) described above are satisfied, as shown in FIG. 6B, an inverted signal of the L1R is outputted as the DATA1, the L1R is outputted as the EARLY1 and an inverted signal of the L1R is outputted as the LATE1. Similarly, if (condition 2) and (condition 2-2) are satisfied, an inverted signal of the H1R is outputted as the DATA0, an inverted signal of the H1R is outputted as the EARLY0 and the H1R is outputted as the LATE0.

As described above, the semiconductor integrated circuit device shown in FIGS. 6A and 6B determines the symbol determination result and the phase comparison result at the focused data cycle t[0] using the latch results at the focused data cycle t[0] and the next data cycle t[1] in addition to the symbol determination result at the previous data cycle t[−1]. And therefore, in addition to expansion of the margin by using the symbol determination result at the previous cycle described in the first embodiment, it is possible to achieve further expansion of the margin using the latch result at the next data cycle. That is, if the symbol determination result at the previous data cycle and the latch result at next data cycle are provided, the symbol at the focused data cycle can be determined accurately, and therefore, an accurate symbol determination result and an accurate phase comparison result can be obtained even if a waveform of a received symbol sequence (input data signals) is fluctuated relatively largely according to its own band.

Figure 7A:
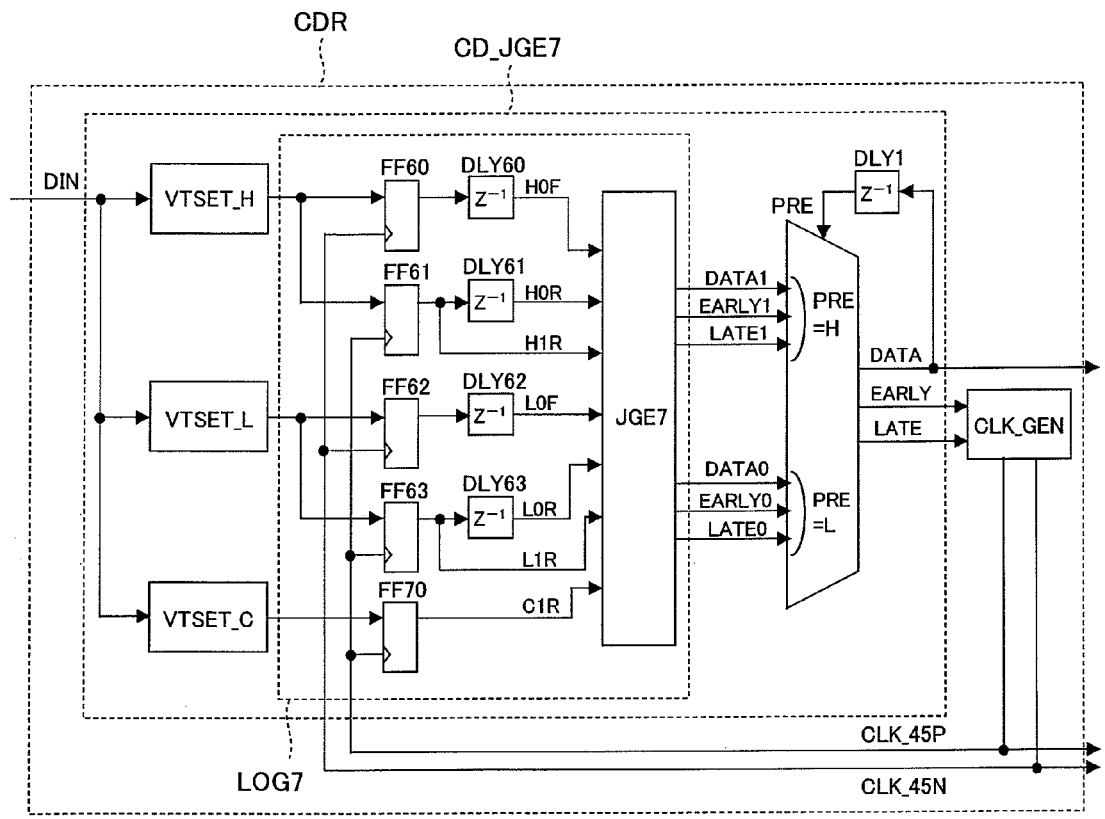
FIG. 7A is a circuit diagram showing a configuration example of a modification example of FIGS. 6A and 6B.
Figure 7B:
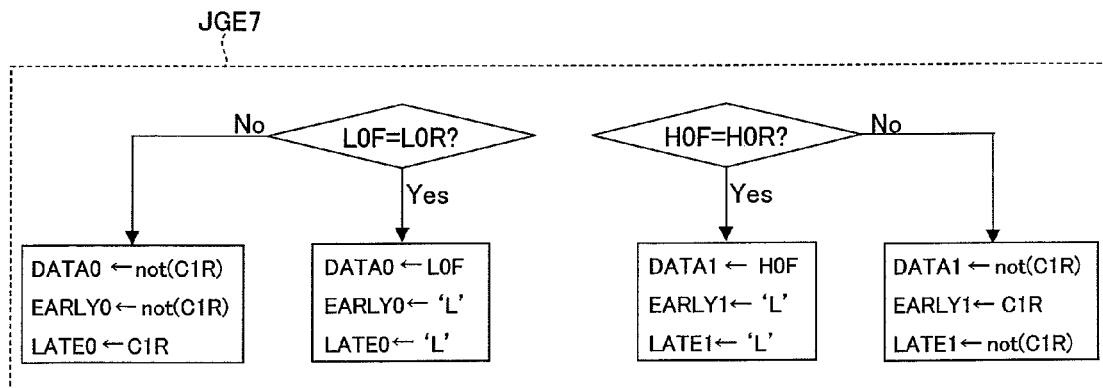
FIG. 7B is an explanatory diagram showing a logic content in a determination processing circuit in FIG. 7A of a modification example of FIGS. 6A and 6B.

Now, in the configuration shown in FIGS. 6A and 6B and the operation shown in FIGS. 8A and 8B, the latch result of the H1R or the L1R at the next data cycle t[1] is used, however, the latch result at the C1R positioned at the threshold VT_C of the intermediate level of t[1] can be used instead of the latch result described above, as shown in FIG. 8B. A configuration in this case is shown in FIGS. 7A and 7B. FIGS. 7A and 7B show a modification example of the semiconductor integrated circuit device shown in FIGS. 6A and 6B. FIG. 7A is a circuit diagram of a configuration example of the modification, and FIG. 7B is an explanatory diagram showing a logic content of a determination processing circuit in FIG. 7A.

A clock and data determination circuit CD_JGE7 shown in FIG. 7A has a configuration in which a threshold setting circuit VTSET_C and a latch circuit FF74 for latching output of the threshold setting circuit VTSET_C are added to the CD_JGE6 shown in FIGS. 6A and 6B and a logic content in the determination processing circuit JGE7 is slightly modified according to the addition. The other configuration is similar to that shown in FIGS. 6A and 6B, and therefore, detailed explanation thereof is omitted. The VTSET_C is a circuit for setting a threshold VT_C of an intermediate level between the VT_H and the VT_L shown in FIG. 8B. The FF74 latches output of the VTSET_C by the clock signal CLK_45P and outputs a latch result to the JGE7 as the signal C1R.

The logic content in JGE7 has a configuration obtained by replacing the L1R and the H1R in the JGE6 shown in FIG. 6B by the C1R, as shown in FIG. 7B. If a configuration utilizing three thresholds in this manner is used, a circuit area is increased due to the VTSET_C, but, as understood from FIG. 8B, a determination margin in a voltage axis (vertical axis) direction can be expanded as compared with a case in which the H1R and the L1R are used and a configuration utilizing two thresholds is employed. Accordingly, a further accurate symbol determination result and a further accurate phase comparison result can be generated.

As described above, by using the semiconductor integrated circuit device according to the third embodiment, a margin to waveform variations of input data signals can be improved. And, by applying the semiconductor integrated circuit device according to the third embodiment to a transmission system, high-speed transmission can be realized.

Fourth Embodiment

In a fourth embodiment, a detailed configuration example different from that in FIG. 2 in the semiconductor integrated circuit device shown in FIG. 1 is explained. A main feature of the semiconductor integrated circuit device according to the fourth embodiment is that phase comparison is performed by the edge adjusting method, not by the eye track method shown in the first embodiment and the like. As for operation performance of phase comparison, the eye track method is considered to be superior to the edge adjusting method. But, since the edge adjusting method can be realized even by a one-phase clock signal, the edge adjusting method can be considered to be superior to the eye track method in area efficiency.

Figure 9:
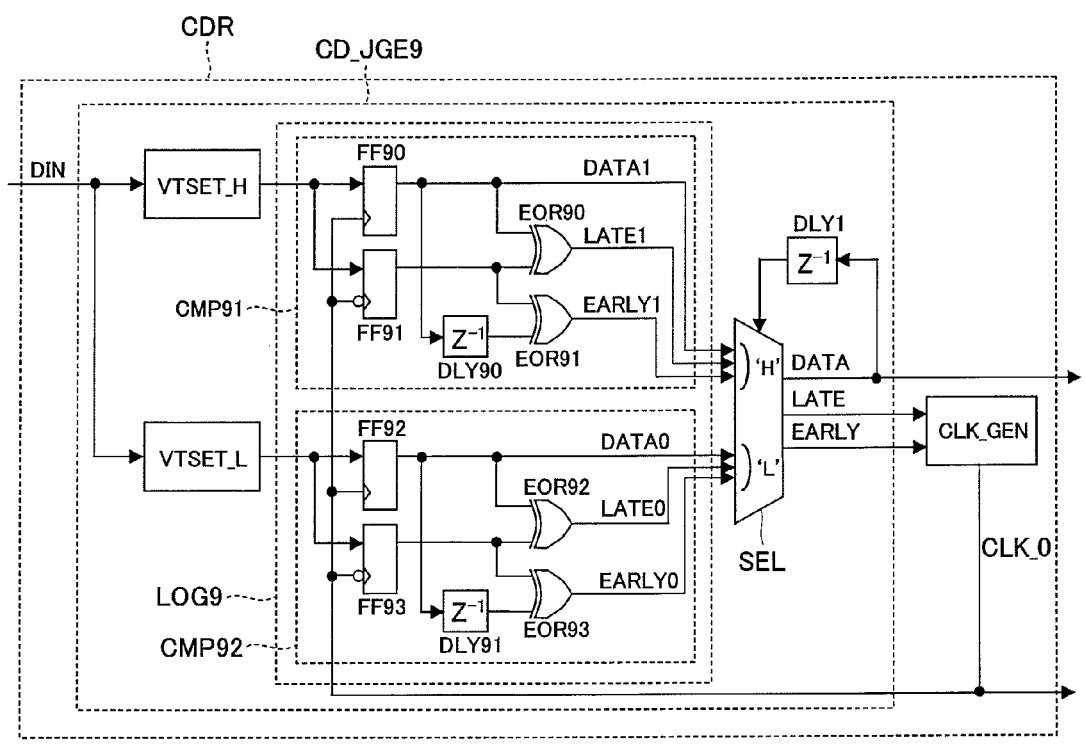
FIG. 9 is a circuit diagram showing a detailed configuration example of FIG. 1 in a semiconductor integrated circuit device according to a fourth embodiment of the present invention.

FIG. 9 is a circuit diagram showing a detailed configuration example of FIG. 1 in the semiconductor integrated circuit device according to the fourth embodiment of the present invention. The semiconductor integrated circuit device shown in FIG. 9 is different from the semiconductor integrated circuit device shown in FIG. 2 in an interior of a logic circuit LOG9 included in a clock and data determination circuit CD_JGE9 and in that the clock signal generating circuit CLK_GEN generates only the clock signal CLK_0. The other configuration of the semiconductor integrated circuit device according to the fourth embodiment is similar to that of the semiconductor integrated circuit device shown in FIG. 2, and therefore, detailed explanation thereabout is omitted.

The logic circuit LOG9 includes a comparison circuit CMP91 receiving output of the VTSET_H, performing various comparisons and determinations and outputting a signal group (DATA1, EARLY1, LATE1), and a comparison circuit CMP92 similarly receiving output of the VTSET_L and outputting a signal group (DATA0, EARLY0, LATE0). The CMP91 is composed of two latch circuits FF90 and FF91, a one-cycle delay circuit DLY90, and two EXOR circuits EOR90 and EOR91.

The FF90 latches output of the VTSET_H at rising of the CLK_0 and outputs a latch result to the selector circuit SEL as the data signal DATA1. The FF91 latches output of the VTSET_H at falling of the CLK_0 and outputs a latch result to the EOR90 and the EOR91. The EOR90 performs an EXOR operation of the latch result of the FF90 and the latch result of the FF91 and outputs a result of the operation to the SEL as the phase comparison signal LATE1. The EOR91 performs an EXOR operation of a signal obtained by delaying the latch result of the FF90 by the DLY90 and the latch result of the FF91 and outputs a result of the operation to the SEL as the phase comparison signal EARLY1.

The CMP92 has a configuration similar to that of the CMP91 and composed of two latch circuits FF92 and FF93, a one-cycle delay circuit DLY91, and two EXOR circuits EOR92 and EOR93. The FF92 latches output of the VTSET_L at rising of the CLK_0 and outputs a latch result to the SEL as the data signal DATA0. The FF93 latches output of the VTSET_L at falling of the CLK_0 and outputs a latch result to the EOR92 and the EOR93. The EOR92 performs an EXOR operation of the latch result of the FF92 and the latch result of the FF93 and outputs a result of the operation to the SEL as the phase comparison signal LATE0. The EOR93 performs an EXOR operation of a signal obtained by delaying the latch result of the FF92 by the DLY91 and the latch result of the FF93 and outputs a result of the operation to the SEL as the phase comparison signal EARLY0.

Figure 10:
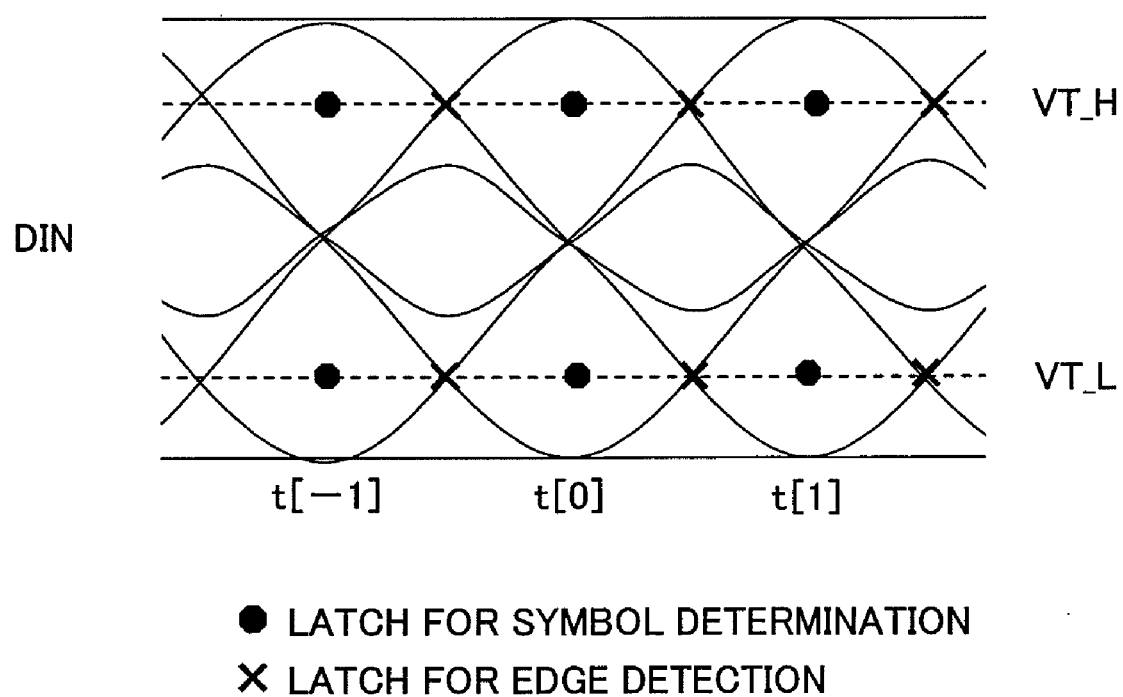
FIG. 10 is a waveform diagram explaining an operation example of symbol determination and phase comparison in the semiconductor integrated circuit device shown in FIG. 9.

FIG. 10 is a waveform diagram for explaining operation example of symbol determination and phase comparison in the semiconductor integrated circuit device shown in FIG. 9. The semiconductor integrated circuit device shown in FIG. 9 performs phase comparison using the edge adjusting method described in FIGS. 19A and 19B. In FIG. 10, the threshold VT_H is set to a voltage level at a point of crossing of waveform orbits (HHL) and (LHH) and the threshold VT_L is set to a voltage level at a point of crossing of (LLH) and (LHH). And, a falling timing of the CLK_0 is adjusted to these points of crossing (x mark in FIG. 10) using the edge adjusting method and symbol determination is performed at a rising timing (● mark in FIG. 10) of the CLK_0.

For example, at a data cycle t[0], a latch result of the FF90 in FIG. 9 (for example, corresponding to ● mark in the VT_H side of t[0] in FIG. 10) is outputted as the DATA1, and the latch result of the FF90 and the latch result of the FF91 (for example, corresponding to x mark in the VT_H side between t[-1] and t[0]) are compared with each other in the EOR90. And, the latch result of the FF91 and output of the DLY90 in FIG. 9 (for example, corresponding to ● mark in the VT_H side of t[-1] in FIG. 10) are compared with each other in the EOR91.

If the latch result of the FF90 and the latch result of the FF91 are different in symbol (namely, if an edge of the DIN exists between these latch timings), LATE1='H' is outputted by the EOR90. On the other hand, if the output of the DLY90 and the latch result of the FF91 are different in symbol, EARLY1='H' is outputted by the EOR91. In a case where a symbol determination result at the data cycle t[-1] is 'H', the signal group (DATA1, EARLY1, LATE1) is outputted via the SEL. The clock signal generating circuit CLK_GEN corrects a phase of the CLK_0 to a left side based on a 'H' level of the EARLY and corrects the phase of the CLK_0 to a right side based on a 'H' level of the LATE.

As described above, by applying the semiconductor integrated circuit device according to the fourth embodiment to a transmission system, high-speed transmission can be realized.

Fifth Embodiment

In a fifth embodiment, a configuration example in which the configuration shown in FIG. 9 in the fourth embodiment is modified is explained. A main feature of a semiconductor integrated circuit device according to the fifth embodiment is that a function performing phase comparison only at input of a specific symbol sequence is added to the configuration shown in FIG. 9.

Figure 11:
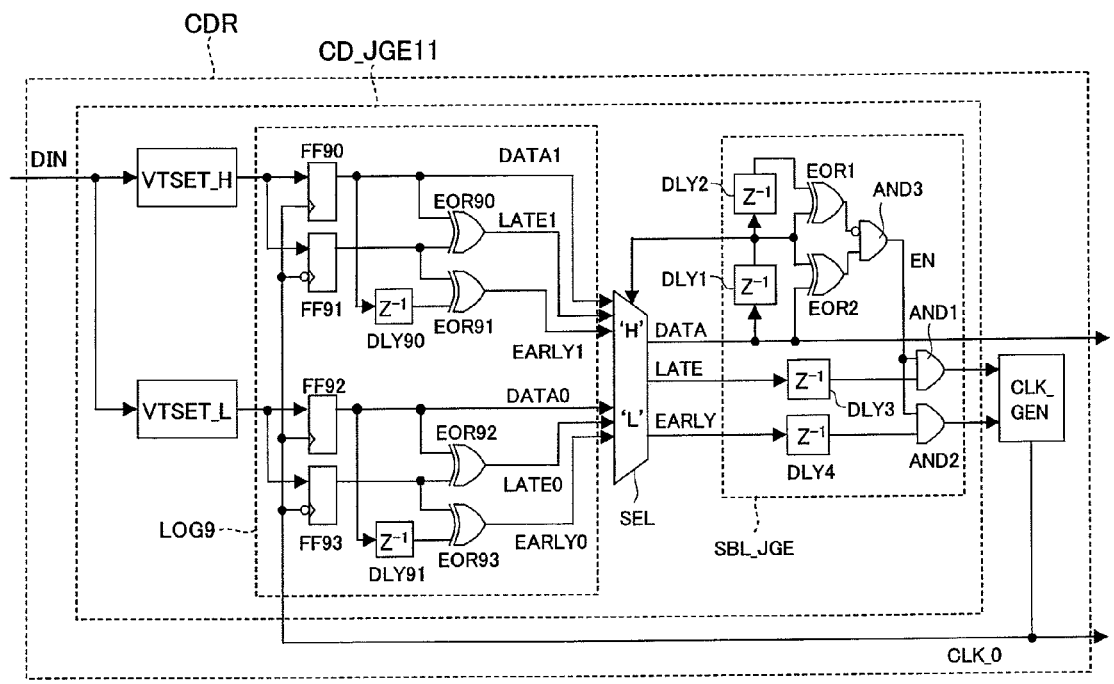
FIG. 11 is a circuit diagram showing a configuration example obtained by modifying the circuit shown in FIG. 9 in a semiconductor integrated circuit device according to a fifth embodiment of the present invention.

FIG. 11 is a circuit diagram showing a configuration example in which the configuration shown in FIG. 9 is modified in the semiconductor integrated circuit device according to the fifth embodiment of the present invention. The semiconductor integrated circuit device shown in FIG. 11 is different from the semiconductor integrated circuit device shown in FIG. 9 in that a symbol sequence determination circuit SBL_JGE is added to output of a selector circuit SEL included in a clock and data determination circuit CD_JGE11. The other configuration of the semiconductor integrated circuit device according to the fifth embodiment is similar to that of the semiconductor integrated circuit device shown in FIG. 9, and detailed explanation thereabout is omitted.

The symbol sequence determination circuit SBL_JGE includes three one-cycle delay circuits DLY2 to DLY4, two EXOR circuits EOR1 and EOR2, and three AND circuits AND1, AND2, and AND3 in addition to the one-cycle delay circuit DLY1 shown in FIG. 1 and the like. The EOR2 performs an EXOR operation of the data signal DATA outputted from the SEL and a signal obtained by passing the DATA through the DLY1. The EOR1 performs an EXOR operation of the signal obtained by passing the DATA through the DLY1 and a signal obtained by further passing the signal through the DLY2. Output of the EOR2 is inputted into one of input terminals of the AND3, output of the EOR1 is inverted and inputted into the other of the input terminals of the AND3, and a result of an AND operation of the AND3 is outputted as an enable signal EN. And thereby, the EN becomes 'H' when (outputs of the DATA and the DLY1, output of the DLY2) is (L, H, H) or (H, L, L). That is, when the symbol sequence is (HHL) or (LLH), the EN becomes H'.

The EN is inputted into one of input terminals of the AND1 and one of input terminals of the AND2. A phase comparison signal LATE which is output of the SEL is inputted into the other of the input terminals of the AND1 via the DLY3. The phase comparison signal EARLY which is output of the SEL is inputted into the other of the input terminals of the AND2 via the DLY4. And, output of the AND1 and the AND2 are inputted into the CLK_GEN. Accordingly, only when the symbol sequence is (HHL) or (LLH), 'H' of the EARLY or the LATE is transmitted to the CLK_GEN. Note that, the DLY3 and the DLY4 are for adjusting the number of clock stages.

Figure 12A:
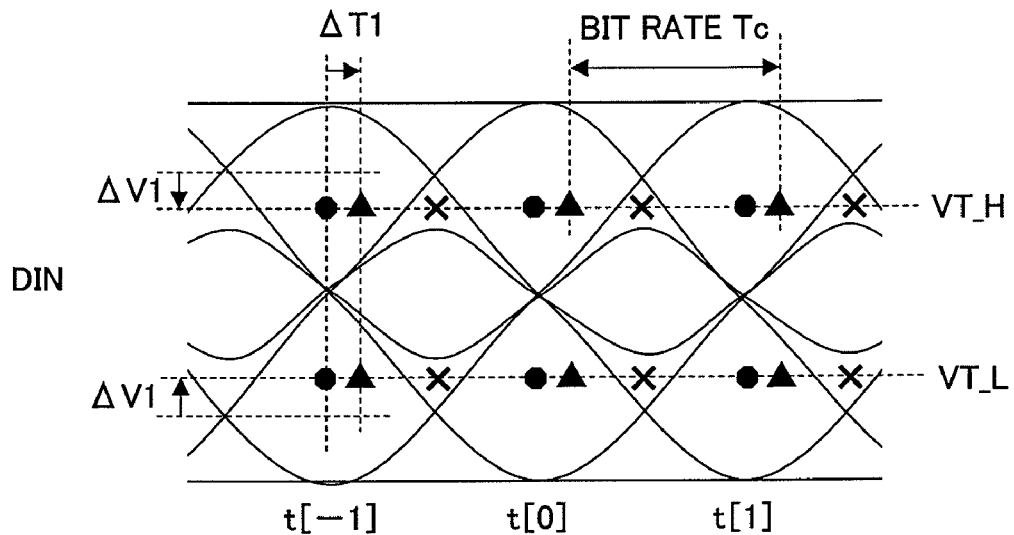
FIG. 12A is a waveform diagram explaining an operation example of symbol determination and phase comparison in the semiconductor integrated circuit device shown in FIG. 11 and explaining operation of symbol determination and phase comparison to the waveform.
Figure 12B:
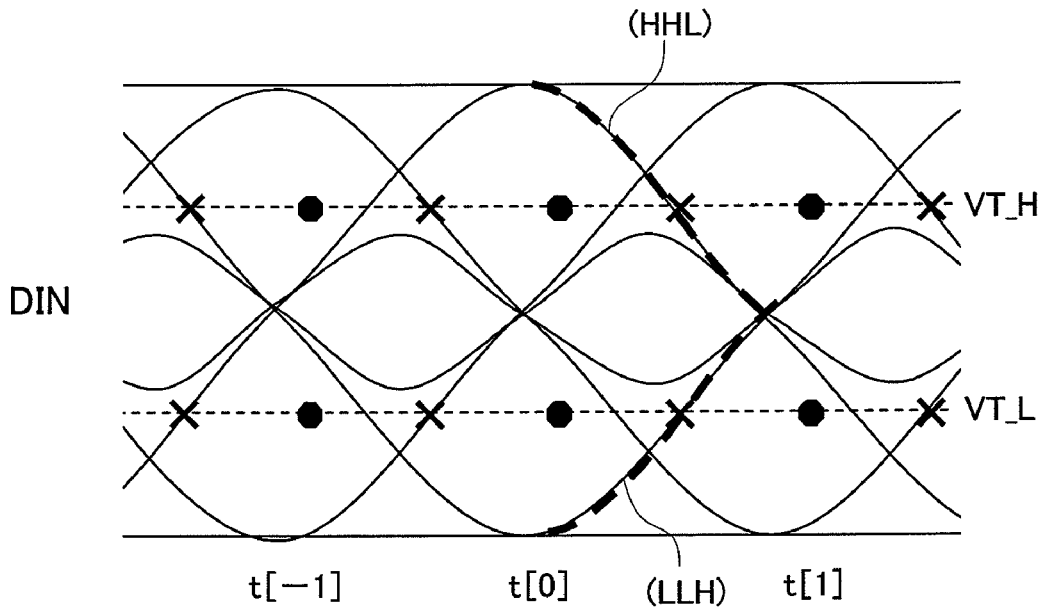
FIG. 12B is a waveform diagram explaining an operation example of symbol determination and phase comparison in the semiconductor integrated circuit device shown in FIG. 11 and explaining operation for symbol determination and phase comparison to the waveforms.

FIGS. 12A and 12B are waveform diagrams for explaining operation examples of symbol determination and phase comparison in the semiconductor integrated circuit device shown in FIG. 11.

FIG. 12A shows a case in which the thresholds VT_H and VT_L are set at positions closer to an intermediate level than the threshold in FIG. 10 by ΔV1 in the semiconductor integrated circuit device of the fourth embodiment. Here, it is optimal to dispose a timing of latching for symbol determination to a timing (Δ mark in FIG. 12A) which is shifted from the timing of latching for symbol determination in FIG. 10 by, for example, about ΔT1=(bit rate Tc×¼ (=phase of 90 degrees)). And thereby, as described in the first embodiment, a margin to variations of waveforms in a vertical axis direction can be expanded easily. Note that, an effect obtained by shifting a threshold in this manner is not limited to this embodiment and it can be similarly obtained by the other embodiments. However, in the semiconductor integrated circuit device according to the fourth embodiment, for example, since the waveform orbits (HHL) and (LHH) are not distinguished therebetween in the VT_H side, a falling timing of the CLK_0 falls in an intermediate point between waveform orbits (HHL) and (LHH), that is, at a position x-marked in FIG. 12A, and therefore, an optimal point cannot be achieved. Accordingly, in the fourth embodiment, the thresholds VT_H and VT_L have to be set at the thresholds in FIG. 10.

In the fifth embodiment, in order to solve the abovementioned defect of the fourth embodiment, as shown in FIG. 12B, taking only waveform orbits (HHL) and (LLH) as targets, operation of adjusting falling of the CLK_0 to a point of crossing of (HHL) and the VT_H and a point of crossing of (LLH) and the VT_L. By this operation, a falling timing of the CLK_0 can be adjusted to the waveform orbits (HHL) and (LLH), and therefore, a margin to variations of the thresholds VT_H and VT_L can be expanded.

As described above, by using the semiconductor integrated circuit device according to the fifth embodiment, a margin to waveform variations of input data signals can be improved. And, by applying the semiconductor integrated circuit device according to the fifth embodiment to a transmission system, high-speed transmission can be realized.

In the foregoing, the invention made by the inventors of the present invention has been concretely described based on the embodiments. However, the present invention is not limited to the foregoing embodiments and various modifications and alterations can be made within the scope of the present invention.

For example, in the abovementioned embodiments, a configuration example in which a signal obtained by adding an offset voltage at the threshold setting circuit is latched at the latch circuit has been shown, but a similar configuration can be realized by adjusting a circuit parameter or a processing parameter at a latch circuit of an input initial stage or devising a configuration of the initial-stage latch circuit.

The semiconductor integrated circuit device according to the present invention can be widely applied to, for example, a serial transmission system receiving a bipolar NRZ eye pattern and recovering a data signal and a clock signal.

What is claimed is:

1. A semiconductor integrated circuit device comprising:
   a clock signal generating circuit inputting a first phase comparison signal and generating a clock signal with a phase corrected based on the first phase comparison signal;
   a first circuit outputting the first phase comparison signal indicating whether the phase of the clock signal is appropriate with respect to a phase of an input data signal by phase comparison between the input data signal and the clock signal and outputting a first recovered data signal by latching the input data signal by the clock signal;
   wherein the first circuit comprises:
   a second circuit latching the input data signal by the clock signal using a plurality of thresholds different from each other as logic determination references and outputting a first candidate comprised of a second recovered data signal and a second phase comparison signal and a second candidate comprised of a third recovered data signal and a third phase comparison signal by processing a latch result;
   a third circuit receiving the output of the second circuit, selecting one of the first candidate and the second candidate and outputting the selected one as the first recovered data signal and the first phase comparison signal, and
   wherein the third circuit performs the operation of selecting one of the first candidate and the second candidate at a focused data cycle based on a symbol of the first recovered data signal at a previous data cycle.

2. The semiconductor integrated circuit device according to claim 1,
   wherein the second circuit outputs the first candidate and the second candidate corresponding to the focused data cycle by processing the latch result using the plurality of thresholds corresponding to the focused data cycle.

3. The semiconductor integrated circuit device according to claim 1,
   wherein the second circuit outputs the first candidate and the second candidate corresponding to the focused data cycle by processing the latch result using the plurality of thresholds corresponding to the focused data cycle and a latch result using the plurality of thresholds corresponding to a next data cycle.

4. The semiconductor integrated circuit device according to claim 1,
   wherein the second circuit latches the input data signal at a plurality of timings provided in the clock signal for respective data cycles and generates the second phase comparison signal and the third phase comparison signal by comparison of the results of latching, and
   wherein the clock signal generating circuit refers to the first phase comparison signal comprised of one of the second phase comparison signal and the third phase comparison signal and corrects the phase of the clock signal so that all results of latching at the plurality of timings in the second circuit become the same.

5. The semiconductor integrated circuit device according to claim 1,
   wherein the second circuit latches the input data signal at a plurality of timings provided in the clock signal for respective data cycles and generates the second phase comparison signal and the third phase comparison signal by comparison of the results of latching, and
   wherein the clock signal generating circuit refers to the first phase comparison signal comprised of one of the second phase comparison signal and the third phase comparison signal and corrects the phase of the clock signal so that one of the plurality of timings provided in the clock signal coincides with a timing of an edge of the input data signal.

6. The semiconductor integrated circuit device according to claim 1,
   wherein the second circuit comprises:
   a first threshold setting circuit outputting the input data signal with an offset voltage added;
   a second threshold setting circuit outputting the input data signal with an offset voltage having amplitude different from that of the offset voltage of the first threshold setting circuit added;
   a first latch circuit latching the output of the first threshold setting circuit by the clock signal; and
   a second latch circuit latching the output of the second threshold setting circuit by the clock signal.

7. A semiconductor integrated circuit device comprising:
   a clock signal generating circuit inputting a first phase comparison signal and generating a clock signal with a phase corrected based on the first phase comparison signal;
   a first threshold setting circuit outputting an input data signal with a first offset voltage added;
   a second threshold setting circuit outputting the input data signal with a second offset voltage added;
   a plurality of first latch circuits latching the output of the first threshold setting circuit at a plurality of timings provided in the clock signal, respectively;
   a plurality of second latch circuits latching the output of the second threshold setting circuit at the plurality of timings provided in the clock signal, respectively;
   a first comparison circuit making a determination about the consistency or inconsistency of a logic level with respect to the output of the plurality of first latch circuits and outputting a second phase comparison signal comprised of a result of the determination;
   a second comparison circuit making a determination about the consistency or inconsistency of a logic level with respect to the output of the plurality of second latch circuits and outputting a third phase comparison signal comprised of a result of the determination; and
   a selector circuit inputting the second phase comparison signal and a second recovered data signal comprised of the output of one of the plurality of first latch circuits as a first candidate, inputting the third phase comparison signal and a third recovered data signal comprised of the output of one of the plurality of second latch circuits as a second candidate, selecting one of the first candidate and the second candidate and outputting the selected one as a first recovered data signal and the first phase comparison signal, wherein the selector circuit performs a selecting operation based on a first signal obtained by delaying the first recovered data signal by one data cycle, selects the first candidate when the first signal is in one logic level and selects the second candidate when the first signal is in another logic level.

8. The semiconductor integrated circuit device according to claim 7, wherein each of the first phase comparison signal to the third phase comparison signal includes an EARLY signal indicating that an appropriate phase of the clock signal obtained by using the input data signal as a reference is shifted in a first time axis direction and a LATE signal indicating that the appropriate phase of the clock signal is shifted in a second time axis direction opposite to the first time axis direction.

9. The semiconductor integrated circuit device according to claim 8, wherein the clock signal includes a first timing corresponding to a phase of 0°, a second timing corresponding to a phase of +N° (N>0) and a third timing corresponding to a phase of −N° (N>0), wherein the plurality of first latch circuits includes a third latch circuit latching at the first timing, a fourth latch circuit latching at the second timing and a fifth latch circuit latching at the third timing, wherein the first comparison circuit includes a first EXOR circuit performing logic comparison between an output of the third latch circuit and an output of the fourth latch circuit and activating the LATE signal comprising a part of the second phase comparison signal when a result of the logic comparison is inconsistency and a second EXOR circuit performing logic comparison between the output of the third latch circuit and an output of the fifth latch circuit and activating the EARLY signal comprising a part of the second phase comparison signal when a result of the logic comparison is inconsistency, wherein the plurality of second latch circuits includes a sixth latch circuit latching at the first timing, a seventh latch circuit latching at the second timing, and an eighth latch circuit latching at the third timing, wherein the second comparison circuit includes a third EXOR circuit performing logic comparison between an output of the sixth latch circuit and an output of the seventh latch circuit and activating the LATE signal comprising a part of the third phase comparison signal when a result of the logic comparison is inconsistency and a fourth EXOR circuit performing logic comparison between the output of the sixth latch circuit and an output of the eighth latch circuit and activating the EARLY signal comprising a part of the third comparison signal when a result of the logic comparison is inconsistency, and wherein the clock signal generating circuit corrects the phase of the clock signal so that both of the EARLY signal and the LATE signal included in the first phase comparison signal are inactivated.

10. The semiconductor integrated circuit device according to claim 8, wherein the clock signal includes a first timing corresponding to a phase of 0° and a second timing corresponding to a phase of 180°, wherein the plurality of first latch circuits includes a third latch circuit latching at the first timing and a fourth latch circuit latching at the second timing, wherein the first comparison circuit includes a first EXOR circuit performing logic comparison between an output of the third latch circuit and an output of the fourth latch circuit and activating the LATE signal comprising a part of the second phase comparison signal when a result of the logic comparison is inconsistency and a second EXOR circuit performing logic comparison between a signal obtained by delaying the output of the third latch circuit by one data cycle and the output of the fourth latch circuit and activating the EARLY signal comprising a part of the second phase comparison signal when a result of the logic comparison is inconsistency, wherein the plurality of second latch circuits includes a fifth latch circuit latching at the first timing and a sixth latch circuit performing latching at the second timing, wherein the second comparison circuit includes a third EXOR circuit performing logic comparison between an output of the fifth latch circuit and an output of the sixth latch circuit and activating the LATE signal comprising a part of the third phase comparison signal when a result of the logic comparison is inconsistency and a fourth EXOR circuit performing logic comparison between a signal obtained by delaying the output of the fifth latch circuit by one data cycle and an output of the sixth latch circuit and activating the EARLY signal comprising a part of the third phase comparison signal when a result of the logic comparison is inconsistency, and wherein the clock signal generating circuit corrects the phase of the clock signal so that the second timing is adjusted to an edge of the input data signal based on the EARLY signal and the LATE signal included in the first phase comparison signal.

11. The semiconductor integrated circuit device according to claim 7, wherein, in the plurality of first latch circuits, latching is performed by the first threshold setting circuit using a first threshold in a level higher than an intermediate level of amplitude of the input data signal as a determination reference, and wherein, in the plurality of second latch circuits, latching is performed by the second threshold setting circuit using a second threshold in a level lower than the intermediate level of the amplitude of the input data signal as a determination reference.

12. The semiconductor integrated circuit device according to claim 11, wherein a waveform of the input data signal has a bipolar NRZ eye pattern, and wherein the latch timings in the first latch circuit outputting the second recovered data signal and the latch timings in the second latch circuit outputting the third recovered data signal are set to timings phase-shifted from timings of points of crossing of respective waveform orbits in an intermediate level of amplitude of the bipolar NRZ eye pattern by about 90° according to setting of the first threshold and the second threshold.

13. A semiconductor integrated circuit device comprising:

a clock signal generating circuit inputting a first phase comparison signal and generating a clock signal with a phase corrected based on the first phase comparison signal;

a first threshold setting circuit outputting an input data signal with a first offset voltage added;

a second threshold setting circuit outputting the input data signal with a second offset voltage added;

a plurality of first latch circuits latching the output of the first threshold setting circuit at a plurality of timings provided in the clock signal, respectively;

a plurality of second latch circuits latching the output of the second threshold setting circuit at the plurality of timings provided in the clock signal, respectively;

a first delay circuit delaying the output of the first latch circuits by one data cycle;

a second delay circuit delaying the output of the second latch circuits by one data cycle;

a fourth circuit receiving the output of the first latch circuits and the second latch circuits and the output of the first delay circuit and the second delay circuit, performing comparison in a logic level and outputting a first candidate comprised of a second recovered data signal and a second phase comparison signal and a second candidate comprised of a third recovered data signal and a third phase comparison signal; and a selector circuit selecting one of the first candidate and the second candidate and outputting the selected one as a first recovered data signal and the first phase comparison signal, wherein the selector circuit performs selecting operation based on a first signal obtained by delaying the first recovered data signal by one data cycle and selects the first candidate when the first signal is in one logic level and selects the second candidate when the first signal is in another logic level.

14. The semiconductor integrated circuit device according to claim 13, wherein, in the plurality of first latch circuits, latching is performed by the first threshold setting circuit using a first threshold in a level higher than an intermediate level of amplitude of the input data signal as a determination reference, and wherein, in the plurality of second latch circuits, latching is performed by the second threshold setting circuit using a second threshold in a level lower than the intermediate level of the amplitude in the input data signal as a determination reference.

15. The semiconductor integrated circuit device according to claim 14, further comprising:

a third threshold setting circuit outputting the input data signal with a third offset voltage added; and a third latch circuit latching the output of the third threshold setting circuit using one of the plurality of timings provided in the clock signal, wherein the fourth circuit receives the output of the third latch circuit in addition to the output of the first latch circuits and the second latch circuits and the output of the first delay circuit and the second delay circuit and outputs the first candidate and the second candidate by performing comparison in a logic level, and wherein, in the third latch circuit, latching is performed by the third threshold setting circuit using a third threshold in the intermediate level of the amplitude of the input data signal as a determination reference.

* * * * *